United States Patent
Kiyono et al.

(10) Patent No.: US 7,304,759 B2
(45) Date of Patent: Dec. 4, 2007

(54) DOCUMENT REGISTRATION SYSTEM, METHOD THEREOF, PROGRAM THEREOF AND STORAGE MEDIUM THEREOF

(75) Inventors: Hiroyuki Kiyono, Tokyo (JP); Naoyuki Matsumoto, Kanagawa (JP); Naobumi Fukudome, Kanagawa (JP); Atsushi Kashioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 843 days.

(21) Appl. No.: 10/235,571

(22) Filed: Sep. 6, 2002

(65) Prior Publication Data

US 2003/0063326 A1 Apr. 3, 2003

(30) Foreign Application Priority Data

Sep. 11, 2001 (JP) ............................. 2001-275068
Aug. 2, 2002 (JP) ............................. 2002-226159

(51) Int. Cl.
  *G06F 3/12* (2006.01)
  *G06F 15/00* (2006.01)
  *G06K 1/00* (2006.01)
(52) U.S. Cl. ..................... 358/1.15; 358/440
(58) Field of Classification Search ............. 358/1.15, 358/440
See application file for complete search history.

(56) References Cited

U.S. PATENT DOCUMENTS

| | | | | |
|---|---|---|---|---|
| 5,129,016 A | * | 7/1992 | Murakami et al. | 382/306 |
| 5,963,340 A | * | 10/1999 | Kim | 358/440 |
| 6,529,586 B1 | * | 3/2003 | Elvins et al. | 379/88.13 |
| 6,647,383 B1 | * | 11/2003 | August et al. | 707/3 |
| 6,816,911 B1 | * | 11/2004 | Toyoda et al. | 709/238 |
| 7,020,688 B2 | * | 3/2006 | Sykes, Jr. | 709/206 |

OTHER PUBLICATIONS

U.S. Appl. No. 10/235,755, filed Sep. 6, 2002.

* cited by examiner

*Primary Examiner*—Twyler Lamb
*Assistant Examiner*—Benjamin O. Dulaney
(74) *Attorney, Agent, or Firm*—Fitzpatrick, Cella, Harper & Scinto

(57) ABSTRACT

A FAX document image is acquired from an external device having a FAX receiving function, a telephone number of a transmission source of the FAX document image is acquired, a folder of a document management system as a destination of registration is automatically determined based on a mapping table showing a mapping between the telephone number of the transmission source and the registration destination folder, and the acquired telephone number of the transmission source, the FAX document image is registered in the folder of the document management system as the destination of registration in a way that attaches an index to the FAX document image.

14 Claims, 19 Drawing Sheets

DOCUMENT REGISTRATION SYSTEM, METHOD THEREOF, PROGRAM THEREOF AND STORAGE MEDIUM THEREOF

BACKGROUND OF THE INVENTION

1. Field of the Invention

The present invention relates to a document registration system, a method, a program and a storage medium for registering, in a document management system, a document image acquired from a device in a way that attaches an index to this document image.

2. Related Background Art

A conventional document registration system is that a document image read from a device is temporarily displayed on the screen, and a user manually attaches an index thereto while seeing the screen, specifies a destination of registration and registers the document image and the index together in a document management system.

The conventional document registration system, however, requires the user to perform complicated operations, wherein the document management system is specified as the destination of registration by the user's operation.

SUMMARY OF THE INVENTION

On the other hand, the present applicant devised a document registration system for registering all images acquired from a predetermined device. In such a mode, a folder as a destination of registration is fixed.

The present invention therefore aims at flexibly changing the folder as the destination of registration, corresponding to a document.

According to one aspect of the invention to provide a document registration system comprises acquisition means for acquiring a FAX document image from an external device having a FAX receiving function, telephone number acquisition means for acquiring a telephone number of a transmission source of the FAX document image, determining means for automatically determining a folder of a document management system as a destination of registration on the basis of a mapping table showing a mapping between the telephone number of the transmission source and the registration destination folder, and the acquired telephone number of the transmission source, and registration means for registering the FAX document image in the folder of the document management system as the destination of registration in a way that attaches an index to the FAX document image.

According to another aspect of the invention, a document registration method comprises an acquisition step of acquiring a FAX document image from an external device having a FAX receiving function, a telephone number acquisition step of acquiring a telephone number of a transmission source of the FAX document image, a determining step of automatically determining a folder of a document management system as a destination of registration on the basis of a mapping table showing a mapping between the telephone number of the transmission source and the registration destination folder, and the acquired telephone number of the transmission source, and a registration step of registering the FAX document image in the folder of the document management system as the destination of registration in a way that attaches an index to the FAX document image.

According to still another aspect of the invention, a document registration program comprises program codes, executable by a computer, for making a document registration system executes an acquisition step of acquiring a FAX document image from an external device having a FAX receiving function, a telephone number acquisition step of acquiring a telephone number of a transmission source of the FAX document image, a determining step of automatically determining a folder of a document management system as a destination of registration on the basis of a mapping table showing a mapping between the telephone number of the transmission source and the registration destination folder, and the acquired telephone number of the transmission source, and a registration step of registering the FAX document image in the folder of the document management system as the destination of registration in a way that attaches an index to the FAX document image.

According to a further aspect of the invention, a storage medium is stored with a document registration program comprising program codes, executable by a computer, for making a document registration system executes an acquisition step of acquiring a FAX document image from an external device having a FAX receiving function, a telephone number acquisition step of acquiring a telephone number of a transmission source of the FAX document image, a determining step of automatically determining a folder of a document management system as a destination of registration on the basis of a mapping table showing a mapping between the telephone number of the transmission source and the registration destination folder, and the acquired telephone number of the transmission source, and a registration step of registering the FAX document image in the folder of the document management system as the destination of registration in a way that attaches an index to the FAX document image.

Other features and advantages of the patent invention will be apparent from the following description taken in conjunction with the accompanying drawings, in which like reference characters designate the same or similar portions throughout the figures thereof.

BRIEF DESCRIPTION OF THE DRAWINGS

The accompanying drawings, which are incorporated in and constitute a portion of the specification, illustrate embodiments of the invention and, together with the description, serve to explain the principles of the invention.

DETAILED DESCRIPTION OF THE PREFERRED EMBODIMENTS

Figure 1:
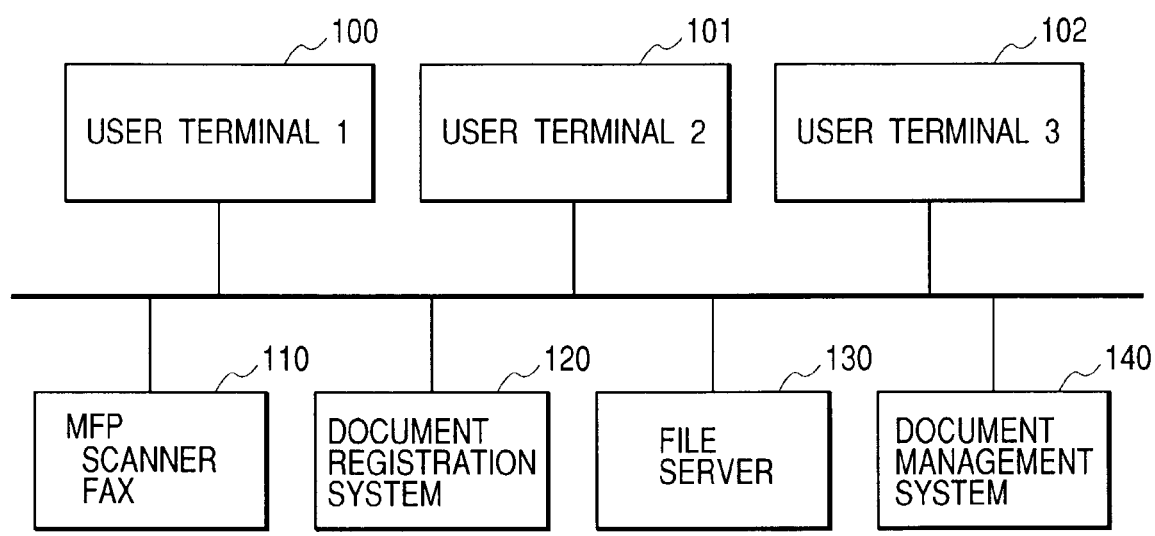
FIG. 1 is a diagram showing a system architecture in an embodiment of the present invention.

FIG. 1 shows a diagram of a system architecture in this embodiment.

Herein, user terminals (100, 101, 102), a MFP (multi-function peripheral) (110) having scanner/printer/copy functions, a document registration system (120), a file server (130) and a document management system (140), are connected to each other on a network.

The respective user terminal share various categories of documents by utilizing the file server 130 and the document management system 140. The categories of the documents include a document created by a general document creating application, a document read by a scanner, a document received by a facsimile and so on, which are intermingled.

Further, according to this embodiment, a document input device involves the use of the MFP 110 incorporating a plurality of functions, however, a single-function device such as a scanner device and a facsimile device may also be used as a substitute for the MFP.

The file server 130 manages concentratedly the documents that are temporarily stored (which will hereinafter be termed "cached") therein. For example, the file server 130 caches document images read by a scanner portion of the MFP 110, and the user terminals and the document registration system 120 can obtain the document images therefrom.

The document management system 140 manages concentratedly the documents that need saving over a long period of time. The document management system 140 stores, together with an index, the document transmitted from the document registration system, and is structured so that the system 140 can, when requested by the user terminal to transmit a desired document, search for this desired document with the index etc used as a key and transmit the same document. Further, the document management system may attach a plurality of indexes to one single document. Moreover, the plurality of indexes are managed in a way that categorizes these indexes according to every index item. Note that an assumption in this embodiment is that the document management system 140 is constructed of one document management device and may also be constructed of a combination of a plurality of devices. Further, there may also exist a plurality of document management systems 140.

The document registration system 120 has a function of automatically or manually specifying and acquiring a document (such as a received-by-facsimile document image, a read-by-scanner document image, etc) generated on the MFP 110 and the user terminal and a document cached in the file server, automatically creating indexes (attribute information/search information) for these documents on the basis of information when obtaining these documents and information obtained by analyzing these documents, and registering these documents attached with the indexes together in (a desired directory of) of the document management system 140. Further, the document registration system 120 has a function of registering the documents in the document management system in a way that attaches the documents with a variety of indexes manually inputted by the user, a function of re-editing the attribute information etc of the documents already registered in the document management system, and so forth. Note that the document registration system 120 is constructed of one document registration device in this embodiment and may also be constructed of a combination of a plurality of devices. Moreover, the document registration system may be configured by using a plurality of document registration devices each authorized to execute processing and executing cooperative processing so that a plurality of users can perform operations such as indexing and confirmation.

Note that the document registration device in this embodiment is a computer constructed of a CPU for executing actual processing operations, a RAM (Random Access Memory) used as a working area for a readout program, a storage medium (such as a hard disk, a ROM (Read Only Memory), a removable disk (a floppy disk, a CD-ROM etc) for storing a program for executing processes corresponding to flowcharts that will be explained later on and various items of data, a key board and a pointing device for performing various operations, a display for displaying the documents etc as processing targets, and a network interface for connecting to the network. The program executed by the CPU may be what is supplied from the storage medium and may also be what is read from an external device via the network. Note that actualization of the present embodiment involves executing the program by the computer, however, a part or the whole of the embodiment may be configured by hardware.

Figure 2:
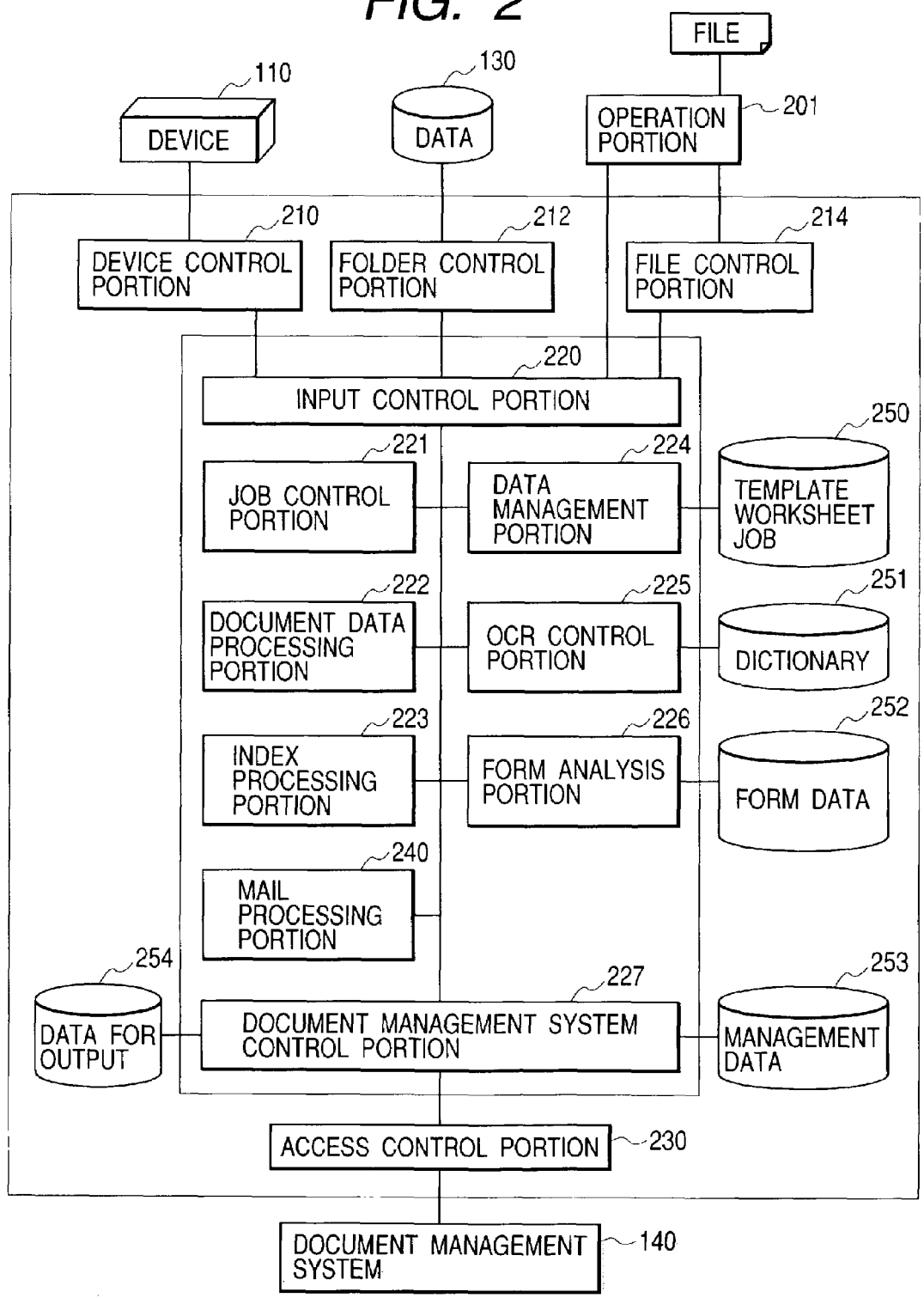
FIG. 2 is a block diagram showing an architecture of a document registration system 120.

FIG. 2 is a block diagram showing an architecture of the document registration system 120.

(Document Input Processing to Document Registration System)

To begin with, document input processing (document acquisition processing by the document registration system) to the document registration system 120 will be explained.

A device control portion 210 obtains document data from the device (MFP) 110 incorporating the fax function and the scanner function, and inputs the same data to a posterior process. Note that the device control portion 210 executes processing such as absorbing the document data by periodically monitoring the device, and receiving the document data transmitted by the push technique from the device.

A numeral 130 represents a folder (storage device) stored with the documents in the file server etc, and a folder control portion 212 acquires the document data from within the folder of the file server. For instance, the folder control portion 212 periodically monitors the predetermined folder of the file server and, if a new document exists, executes processing of acquiring this new document.

A numeral 201 designates an operation portion in this document registration system 120. The operation portion 201 is capable of setting and operating the variety of systems, then importing (acquiring), when the user operating the document registration system specifies the document, the document data from the user terminal and the file server, and executing input processing of inputting the document acquired by the manual specification trough the file control portion 214.

A numeral 220 denotes an input control portion is structured to be capable of controlling in a unified manner the inputs from the device control portion 210, the folder control portion 212 and the file control portion 214.

(Internal Processing of Document Registration System)

Next, processing within the document registration system will be described.

A numeral 221 stands for a job control portion implementing control related to jobs which will be mentioned later on.

A numeral 222 represents a document data processing portion that executes image format conversion processing etc.

A numeral 223 indicates an index processing portion implementing control related to index processing that will be explained later on.

A numeral 224 designates a data managing portion that saves pieces of data about a template, a worksheet, jobs etc which will be described later on in a data storage area 250, and thus manages the data.

A numeral 225 indicates an OCR control portion which recognizes characters with the use of dictionary data 251.

A numeral 226 represents a form (document) analysis portion structured to be capable of automatically identifying a variety of forms, e.g., a document format with the use of registration form data 252.

A numeral 240 indicates a mail processing portion used for notifying, if set to execute processing of automatically obtaining and registering the document and if this automatic processing is implemented, a previously registered destination of a result of this processing.

(Access Processing to Document Management System in Document Registration System)

Subsequently, an interface with the document management system in the document registration system, will be explained.

A numeral 227 denotes a document management system control portion that executes processing such as registering the documents and indexes and changing the indexes to the documents which have already been registered in the document management system through an access control portion 230 provided corresponding to a type of the document management system 140.

A numeral 253 indicates a database for storing access data required for accessing the document management system. A numeral 254 represents a data area for temporarily storing the data to be registered in the document management system. This data area is used as a buffer if document data processing such as a predetermined image conversion etc is needed when registering the document.

((Basic Flow (FIG. 3) of Document Registration System))

Figure 3:
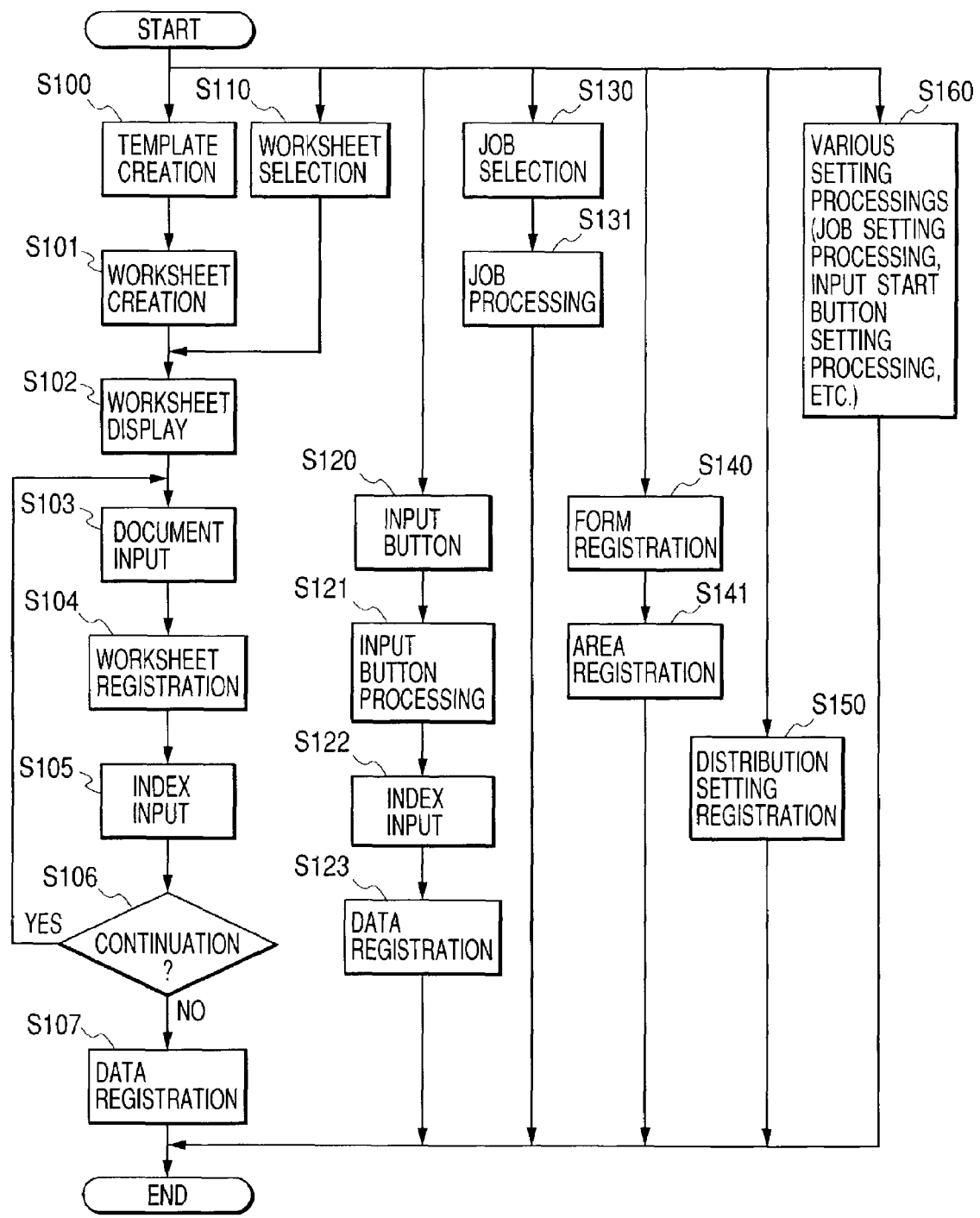
FIG. 3 is a flowchart showing a basic flow in the document registration system.

FIG. 3 is a diagram showing a basic flow in the document registration system 120.

Given herein is an explanation of a processing flow when manually acquiring at first the document (image), thereafter inputting the index (attribute information), and registering the document and the index together in the document management system.

In step S100, an index structure of the database of the document management system is obtained, and a template (modeling form) for creating a worksheet from this index structure is created. This template contains access information to the document management system and schema information (item information that can be used as indexes) created from the index structure. The template creation process will be discussed in detail with reference to FIG. 4.

In step S101, the worksheet is created from the template. This creation processing will be explained in depth referring to FIG. 5. Fields (items) for actually registering the index information and others are set in this worksheet. Further, according to this embodiment, the acquired documents and the index information attached to the documents, are managed in a way that executes a series of processes on a worksheet basis (as in a management table). Note that the worksheet is created from the template created in step S100, however, with an omission of step S100, one of previously created/saved templates is selected, and the worksheet may be created from the selected template.

Further, one of already-created/registered worksheets is selected, and the document information and the index information can be inputted to this selected worksheet. In this case, in step S110, the worksheet chosen by the user among the worksheets stored in the data area 250 is fetched, and processing proceeds to step S102.

In step S102, the worksheet created in step S101 or the worksheet selected in step S110 is displayed on the display.

In step S103, the document acquired from the device is inputted.

In step S104, the document information thereof is registered in the worksheet. To be specific, an inputted document name (document ID) is registered in the item (schema information) of the document name (document ID) in the worksheet, and the document registered in this worksheet can be identified.

In step S105, necessary pieces of index (attribute) information are inputted to the respective items of the worksheet and thus managed. The index information may be manually inputted by the user, and the information automatically obtained from the document by use of an OCR (Optical Character Reader) may also be inputted. The input of the index information will be explained in detail referring to FIG. 10.

In step S106, if required to further input other document, the processing loops back to step S103.

In step S107, the data in the worksheet, which have been obtained and set by the processing described above, undergo release processing (registration processing) to the document management system. Details of the release processing will be explained later on with reference to FIG. 11.

Given next is an explanation of processing in a case where the document input processing is preset to an input start button (FIG. 8) on GUI (Graphical User Interface), and an execution of this processing is triggered by pressing the input start button.

In step S120, upon detecting the event that the input start button is pressed, it is judged what processing is preset to this button. In step S121, there is executed the document acquisition processing (such as processing of acquiring a document stored afresh in the previously specified folder, and processing of acquiring a document image by operating the previously specified scanner to read the original) corresponding to the set condition, and this processing is registered in the preset worksheet. The execution of the input start button processing will hereinafter be described with reference to FIG. 9.

In step S122, the index is inputted to the worksheet. The index input processing will be explained later on referring to FIG. 10.

In step S123, the data in the worksheet, which have been acquired and set by the processing described above, undergo the release processing (registration processing) to the document management system. The details of the release processing will hereinafter be described referring to FIG. 11.

Further, document acquisition setting, index setting and release setting are specified beforehand and are created/saved as jobs, and the job selected by the user (step S130) from the plurality of jobs saved can be also executed (step S131). The job selection/execution processing will be discussed later on referring to FIG. 13.

Moreover, it is possible to, though explained in depth later on, automatically input the index by use of the form when inputting the index in steps S105 and S122. In step S140, processing of registering this form is implemented and in step S141 an area is set in the form. The form registration processing will be explained in detail with reference to FIG. 6, while the area registration processing will be described in depth referring to FIG. 7.

In step S150, registration processing of document image distribution setting (FIG. 18) is executed by setting a piece of telephone number information of a FAX transmission source and a folder corresponding thereto in the document management system.

Executed in step S160 re various categories of setting processing (such as the job setting processing (FIG. 12), the input start button setting processing (FIG. 8), etc) for executing the processing described above.

The processing described above will hereinafter be described in greater detail.

(Template Creation Processing (FIG. 4))

Figure 4:
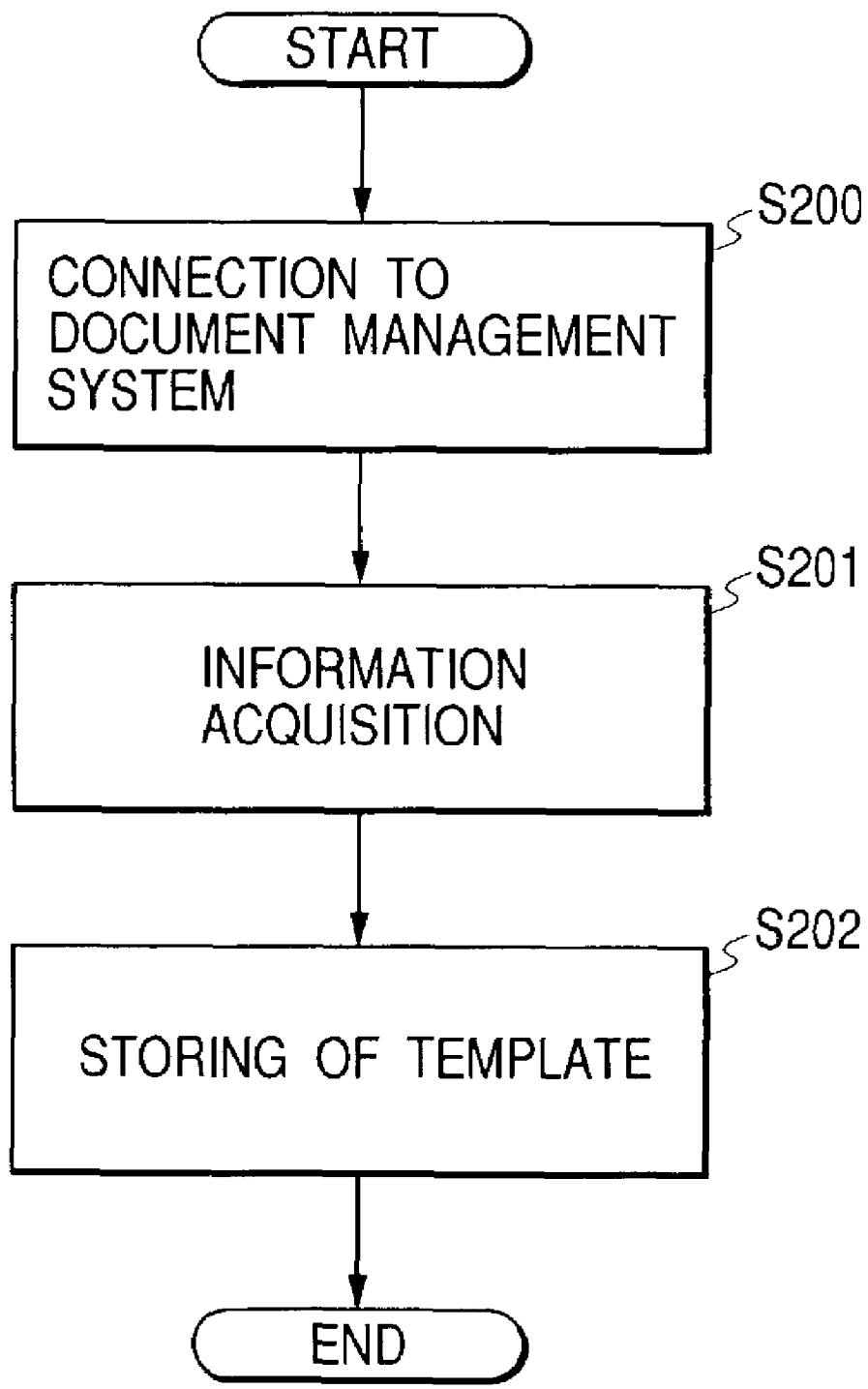
FIG. 4 is a flowchart showing template creation processing.

The template creation processing (step S100) will be described in greater detail referring to FIG. 4.

In step S200, the processing involves at first connecting to the document management system of a destination of the document registration.

In step S201, the index structure (the schema information (operable as indexes for searching) set in the folder etc for storing the documents) of the database in the document management system, is acquired.

In step S202, a template for managing batchwise the information on the connection to the document management system and the schema information, is created and saved in a way that attaches the template with a piece of identifying information (template name) for identifying the thus created template.

(Worksheet Creation Processing (FIG. 5))

Figure 5:
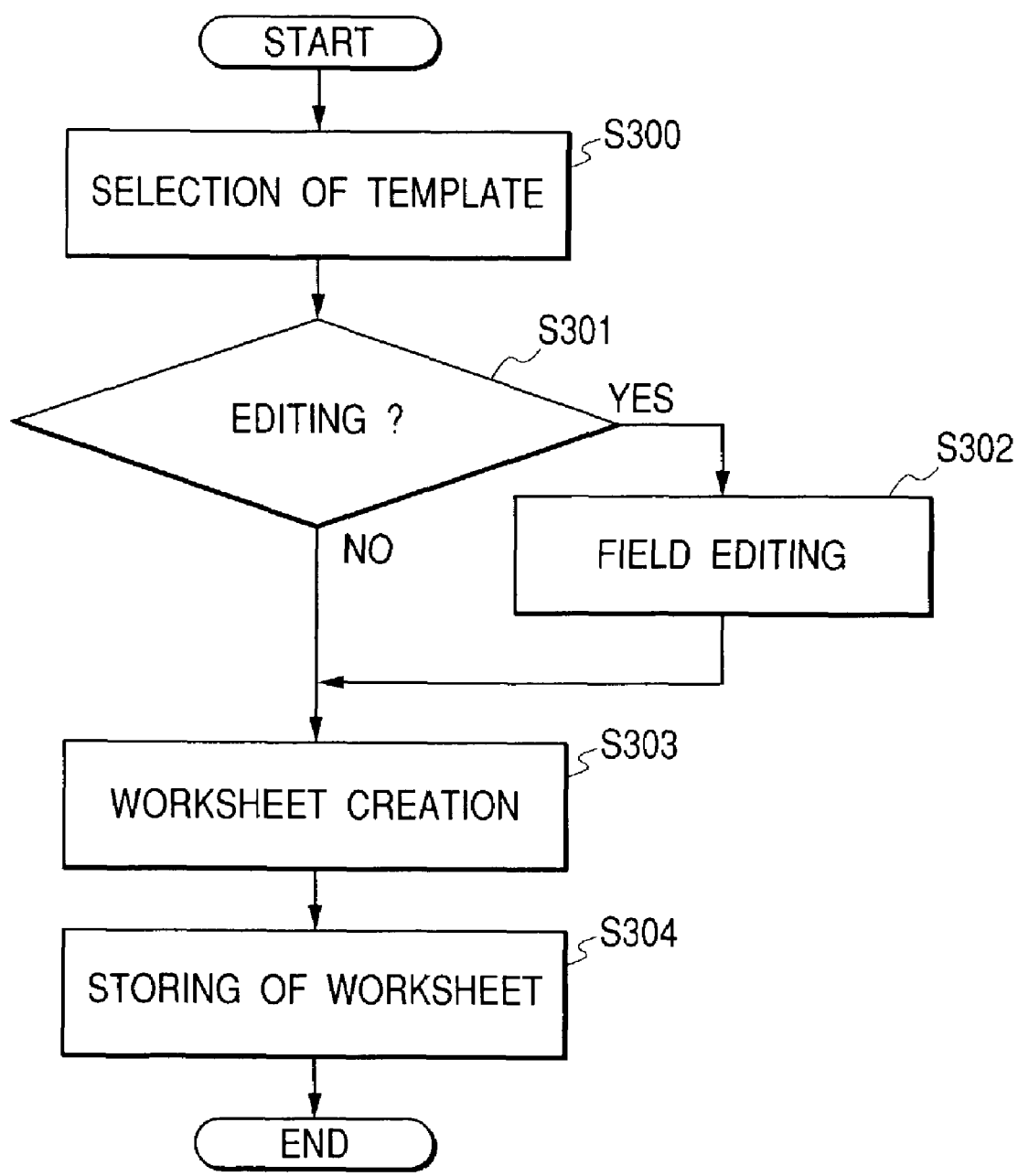
FIG. 5 is a flowchart showing worksheet creation processing.

The worksheet creation processing (step S101) of creating the worksheet from the template saved will be described in depth referring to FIG. 5.

In step S300, to start with, the user is prompted to select the template corresponding to the document management system of the document registering destination. Note that this selection step may be omitted in the case of creating the worksheet directly from the template created in FIG. 4.

In step S301, if a certain item of saved-in-the-template schema information of the document management system does not need index inputting, it is judged whether there is given an indication of whether editing should be done such as selecting a field, as an input target, corresponding to this item of schema information.

In the case of judging that the field edit is carried out, the field edit operation is performed in step S302. This operation is basically an operation of selecting a necessary field among the fields (item areas) of the template that can be used as the schema information, and an indication of extending the field (item area) can be given as the case may be.

In step S303, the predetermined setting such as the field edit etc is confirmed, and the worksheet is created from the selected template.

In step S304, the worksheet is saved in a way that attaches the worksheet with the identifying information (the worksheet name) for identifying the created worksheet.

(Form Registration Processing (FIG. 6))

Figure 6:
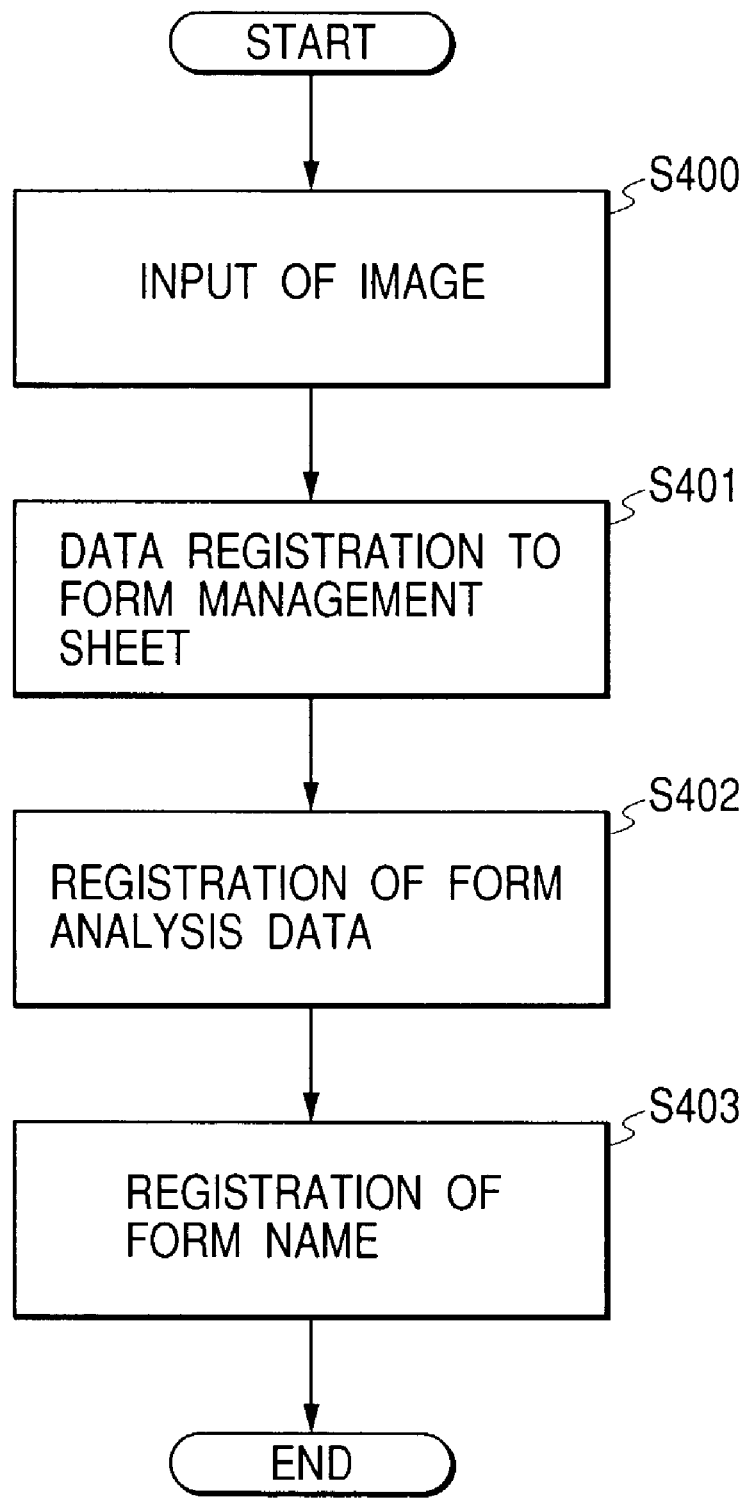
FIG. 6 is a flowchart showing form registration processing.

The form registration processing (step S140) of registering the form used for processing of identifying the inputted document and processing of extracting the information from the image as an index, will be explained in detail with reference to FIG. 6.

In step S400, image data serving as a reference when analyzing the form are obtained.

In step S401, the image data obtained beforehand are registered in a form management sheet for managing the variety of forms.

In step S402, the image data are transferred to the form analysis portion 226 for executing form analysis processing (of analyzing pieces of information about positions and sizes of a frame and a table configuring the form), wherein the form analysis processing of the image data is executed. Then, a result of the form analysis is registered mapping (corresponding) to the same image data in the form management sheet, which are managed as registration form data 252.

In step S403, a newly added item of registration form data is attached with identifying information (a form registration name) and thus saved.

(Area Registration Processing (FIG. 7))

Figure 7:
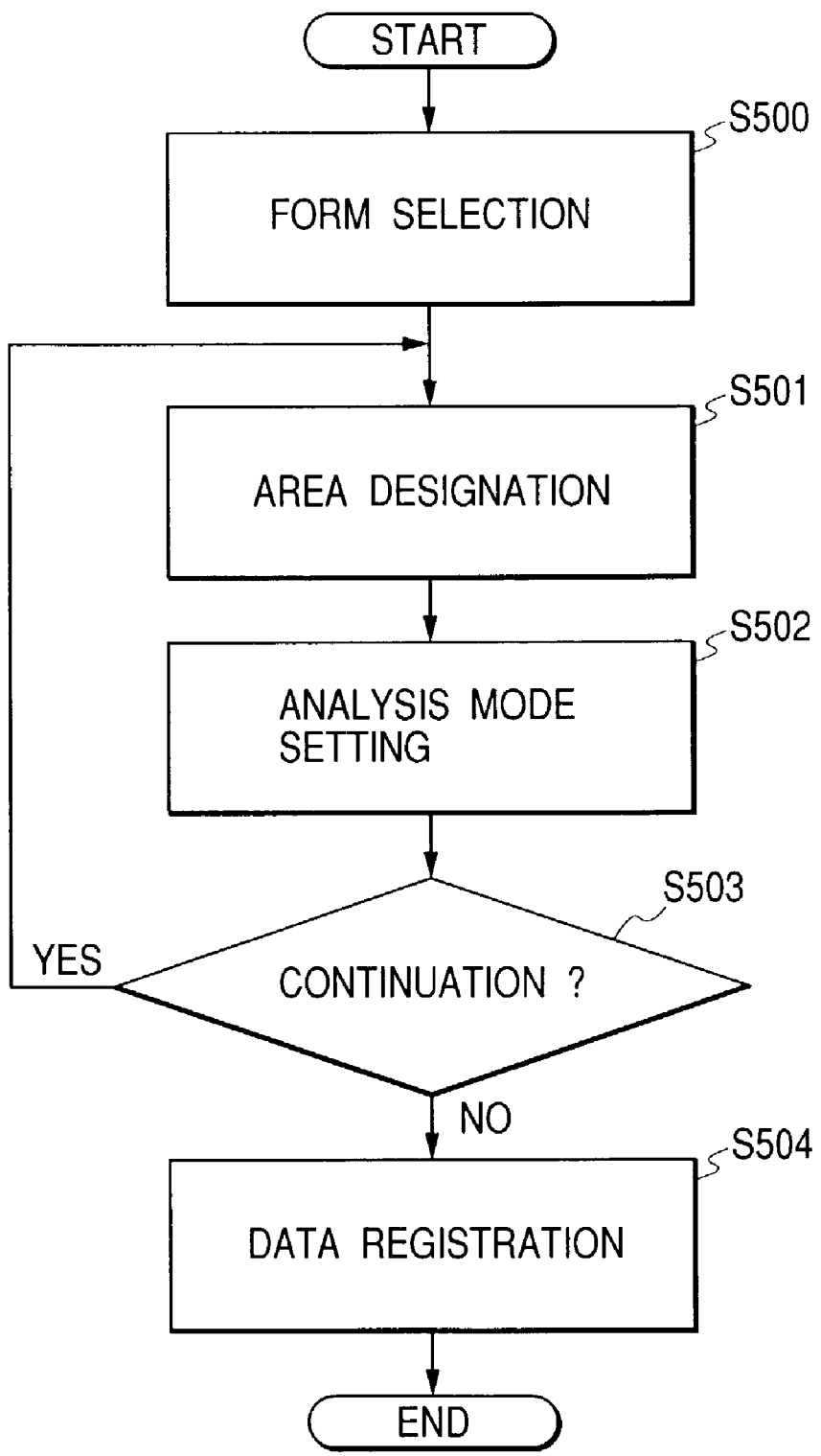
FIG. 7 is a flowchart showing area registration processing.

The area registration processing (step S141) of setting an area for character recognition and barcode recognition on the registration form, will be explained in depth referring to FIG. 7. This area is used for registering a result of the recognition as an index on the worksheet by executing the recognition processing about within the document area corresponding to the area set on the registration form when indexing the document.

In step S500, at first, the user is prompted to select the form for setting the area.

In step S501, the user is prompted to specify an area serving as a form analysis target area.

In step S502, an analysis mode for this area is specified. Detailed conditions for improving a recognition rate are set as the analysis mode. For example, kana/kanji character recognition and an analysis engine for the barcode recognition etc can be specified for every area. Further, mappings of the areas to the template items (worksheet items) can be herein set, wherein when analyzing and registering the document image, the result of recognition of each area is inputted as an index into the worksheet field mapping thereto. Note that the mappings of the areas to the worksheet items (template items) may be changed when executing the index input processing.

In step S503, it is judged whether there is given an indication of setting other area, and, if indicated to set other area, the processing loops back to step S501. Whereas if the area setting comes to an end, the processing proceeds to step S504.

In step S504, the setting information on the set area is registered as added information to the registration form data.

(Input Start Button Setting (FIG. 8))

Figure 8:
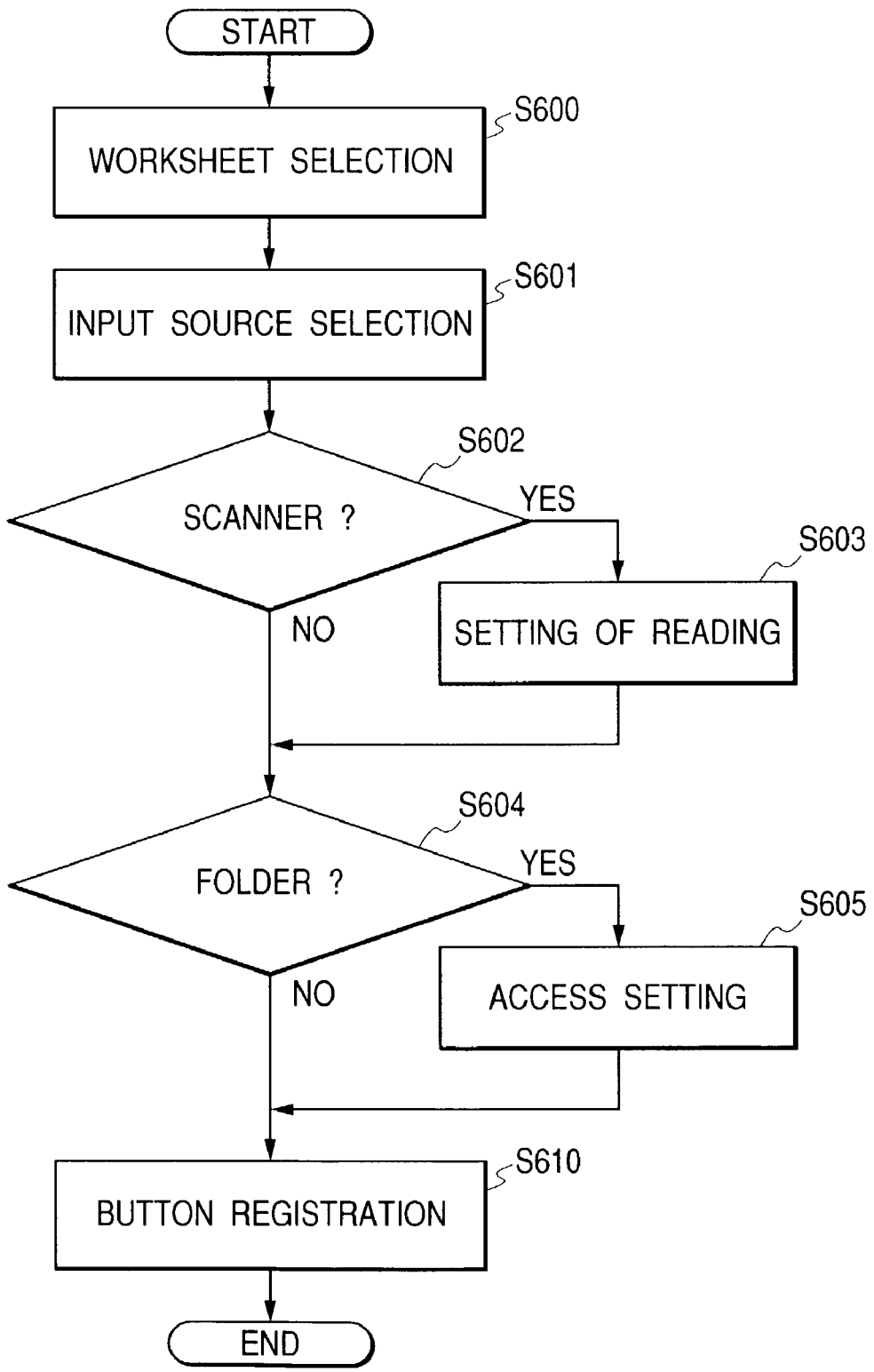
FIG. 8 is a flowchart showing input start button setting processing.

The input start button setting processing (step S160) will be described in detail with reference to FIG. 8. The input start button is used for, when pressed, having input processing from various categories of data sources (such as the folder, the scanner and so on) batch-process.

In step S600, the user is prompted to select the worksheet for registering the document acquired from the set data source when the input start button is pressed.

In step S601, the user is prompted to select the data source (the folder, the scanner etc) from which the document data are acquired.

In step S602, it is judged whether the scanner is specified as the data source and, if the scanner is specified, a scanner reading mode (a reading resolution, a reading area etc) is set in step S603.

In step S604, it is judged whether the folder is specified as the data source and, if the folder is specified, folder access setting (access conditions such as setting an access right) is conducted in step S605.

In step S610, the set conditions are registered mapping to the input start button is displayed (as an icon) under a GUI environment. Further, a plurality of input start buttons may be registered and displayed by changing a name and a configuration of the button in accordance with the setting conditions.

(Input Start Button Execution Processing (FIG. 9))

Figure 9:
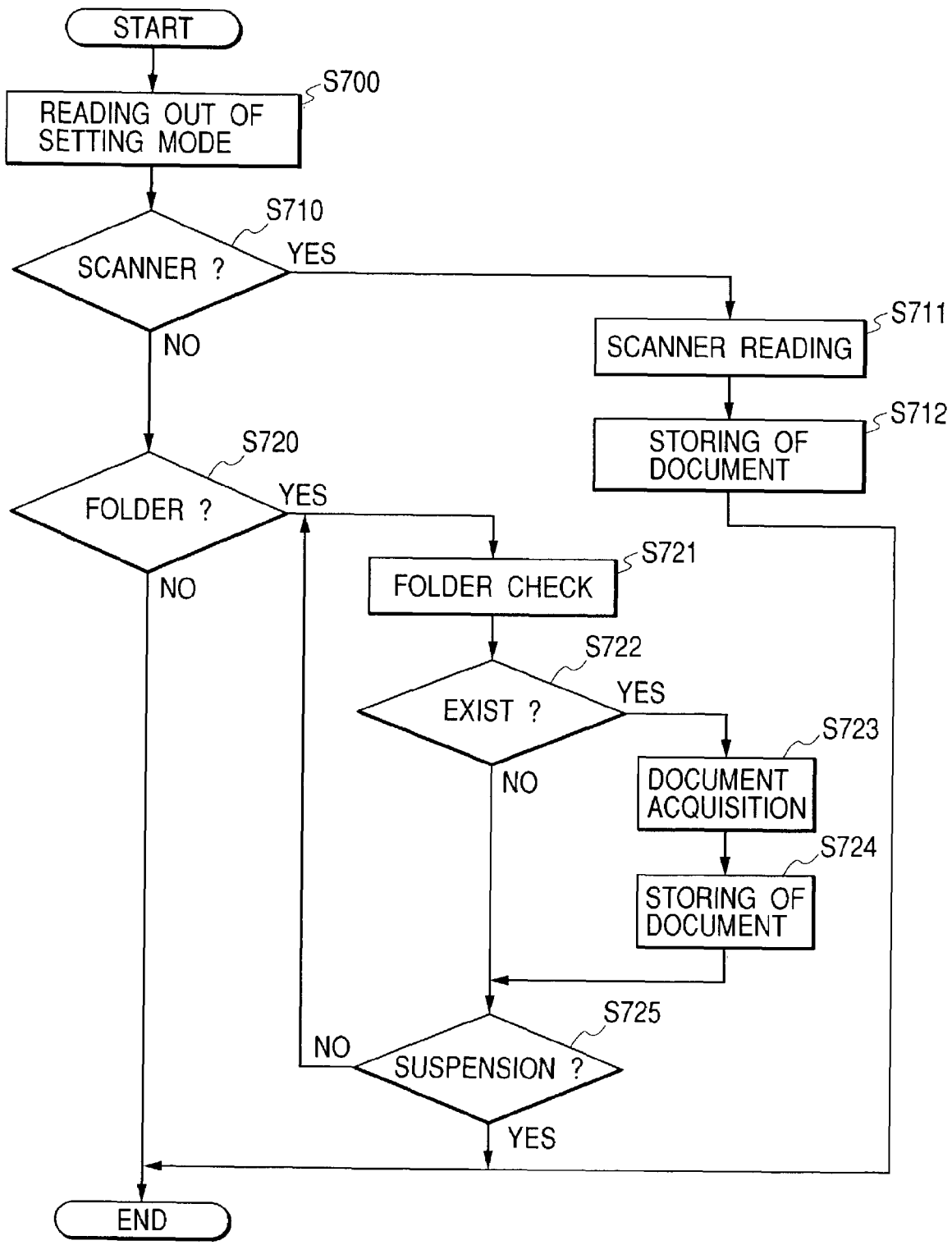
FIG. 9 is a flowchart showing input start button execution processing.

The execution processing (step S121) when the input start button is pressed, will be explained in detail referring to FIG. 9.

In step S700, the conditions (setting mode) set in the pressed input start button are read out.

In step S710, it is judged whether the scanner is specified. If the scanner is specified, the processing proceeds to step S711, wherein the document image is acquired by carrying out a scan based on the scanner reading condition set as the setting mode. In step S712, the document concerned is saved on the worksheet.

In step S720, it is judged whether the document acquisition from the folder is set. If the acquisition from the folder is set, the processing goes to step S721, in which contents of the folder are checked based on conditions (e.g., a condition for obtaining a newly inputted document, and a condition for obtaining a preformatted document) of the document acquisition from the folder. It is judged in step S722 whether there exists a document that meets these conditions. If such a document exists, this document is obtained in step S723 and saved on the worksheet in step S724. Whereas if judging in step S722 that there exists no document that satisfies the conditions, the processing advances to step S725.

Step S725 is judgement processing used when such a condition as to acquire the document by periodically checking (polling) the folder is set. If indicated to halt the periodic folder check or if the setting condition for the periodic folder check is not initially done, the judgment processing is terminated. Whereas if not, the processing goes back gain to step S721, wherein the processing of periodically checking the contents of the specified folder is executed.

(Index Input Processing (FIG. 10))

Figure 10:
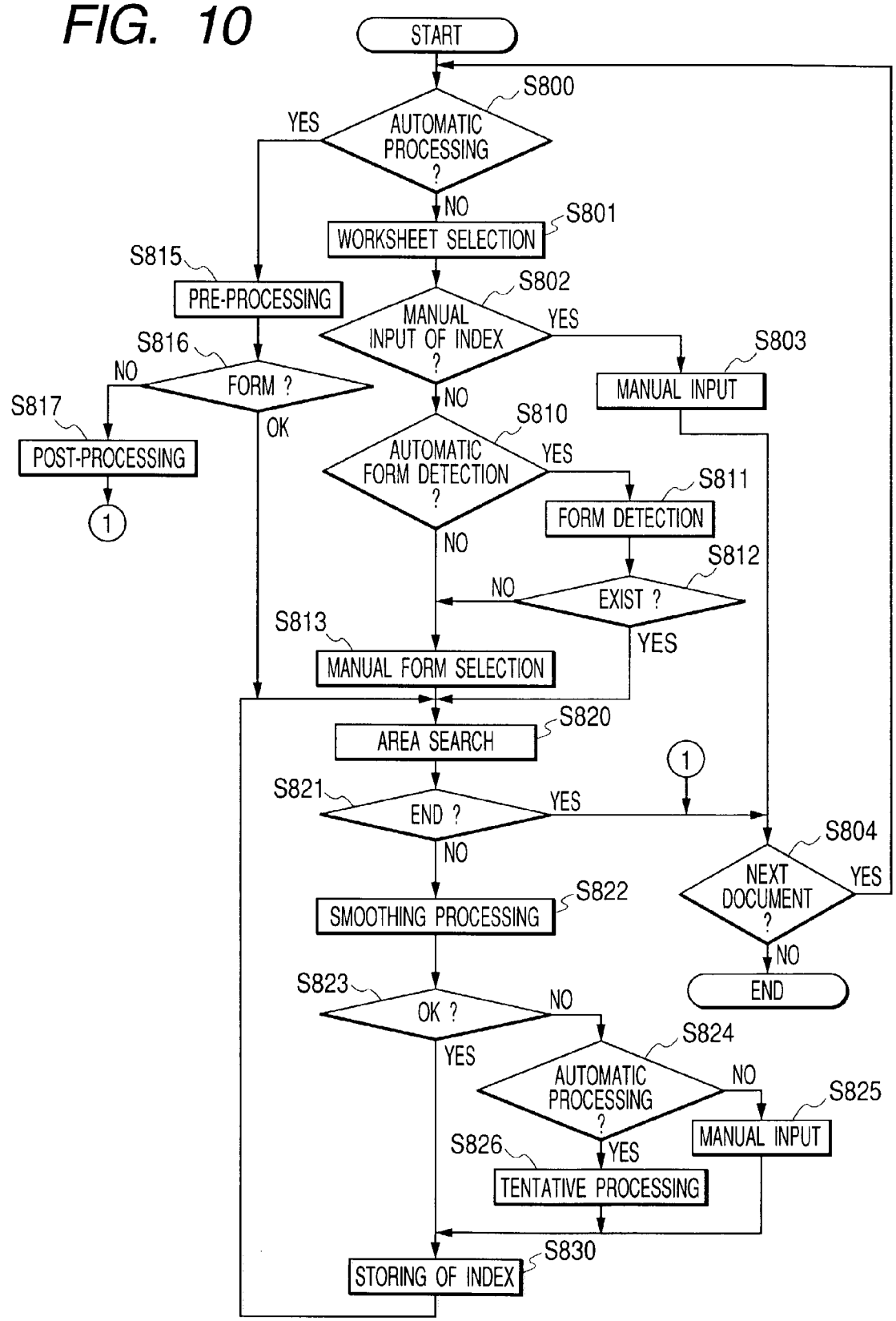
FIG. 10 is a flowchart showing index input processing.

The index input processing (steps S105, S122, S1121) of inputting the document index onto the worksheet will be described in depth referring to FIG. 10.

In step S800, it is judged whether specified to executed the automatic processing such as the job etc. In the case of the automatic processing, the processing diverts to step S815. Whereas if not, the worksheet and the form are selected in sequence.

If not specified to execute the automatic processing, the user specifies the worksheet in step S801, thereby selecting the worksheet.

In step S802, it is judged whether the index is inputted manually by the user or by use of the registration form. If indicated to input the index information manually by the user, the manual index input is executed in step S803. Thereafter, it is judged whether there are still other documents that should be processed in step S804. If judging that there are such other documents, the processing returns to step S800. If not, the processing comes to an end.

While on the other hand, if judging in step S802 that the indication is given so as to implement the index input using the registration form, the processing proceeds to step S810, wherein it is judged whether an automatic form detection function is utilized or not. If it if judged that the indication of utilizing the automatic form detection function is given, form detection processing of detecting a form coincident with the inputted document among the plurality of registration forms registered, is executed in step S811. If the coincident form is detected by the form detection processing, the processing advances to step S820 from step S812. Whereas if the coincident form is not detected, the processing moves to step S813 from step S812. While on the other hand, if judging in step S810 that the utilization of the automatic form detection function is not indicated but the manual form selection is indicated, the processing proceeds to step S813. In step S813, a desired form is manually selected from among the plurality of registration forms by a user's indication.

In step S820, there is searched an area in which the automatically detected or manually selected registration form is set.

In step 821, it is judged whether there is finished the indexing processing that uses the information in the areas corresponding to all the areas set in the registration form with respect to the document concerned. If finished, the processing diverts to step S804, wherein it is judged whether there is a next document. Whereas if not finished, the processing proceeds to step S822.

In step S822, the area is analyzed according to an analysis condition of the area set in the registration form. Note that the user is herein able to positively adjust an area range set as the area analysis condition. The adjustment of the area range is that the area range set as the analysis condition of the set area is displayed overlapped with a rectangular shape assuming a predetermined color in a state of displaying the inputted document image, and the user can adjust the area range by adjusting this rectangular shape. Further, a segment of image data cut out according to the area range undergoes character image smoothing processing (smoothing processing of smoothing edges of a cluster of black pixels). The character image connoted herein includes whatever transfers meanings in configuration of bit arrays of bitmap of the barcode data, the pictorial characters and so on. Note that the smoothing processing of the character image is comprehended in the form of library software by the OCR control portion 225. Jaggies (dispersion of dots) occurred when executing image processing such as an inclination correction, a deviation correction a variable correction and so on, are reduced by effecting the smoothing processing, whereby the recognition rate of the character recognition processing can be improved.

In step S823, it is judged whether successful without any occurrence of abnormality in the area analysis processing. In the case of an abnormal end, the processing proceeds to step S824, wherein it is judged whether it is an automatic processing mode. If not the automatic processing mode, the user is prompted to manually input the index in step S825. In the case of the automatic processing mode, tentative processing is carried out in step S826. The tentative processing connoted herein is processing of attaching an NG mark indicating that, e.g., the area analysis ends up with a failure and outputting a value specified as other default value by way of an index.

In step S830, the result of executing the area analysis processing is stored on the worksheet, and the processing returns to step S820, in which other unprocessed area is searched for.

Whereas if judging in step S800 that the automatic processing of the job etc is specified, the worksheet set to the automatic processing is selected in step S815, and preprocessing of the automatic indexing processing is carried out. The premise herein is that the worksheet is preset to the automatic processing. If the registration form is also set to the automatic processing, it is assumed that the form has been detected directly in step S816, and therefore the processing proceeds to step S820. Further, if the setting that the registration form is automatically detected and selected is done in this automatic processing, the same form detection processing as in step S811 is executed in the preprocessing thereof. If the coincident registration for is detected, it is assumed that the registration form has been detected in step S816, and therefore the processing proceeds to step S820. By contrast, if the registration is not established, the processing diverts to postprocessing of step S817, wherein the document concerned is managed on the worksheet as a document that could not be processed. Then processing advances to step S804, wherein it is judged whether a next document is to be processed or not.

(Release (Data Registration) Processing (FIG. 11))

Processing (S107, S123, S1131 etc) of releasing (registering) pieces of data (document information and index information) managed on the worksheet to the document management system, will be explained in detail with reference to FIG. 11.

In step S900, it is judged whether an automatic release is specified. If judging that the automatic release is specified, the processing diverts to step S901. Whereas if not, the processing proceeds to step S910.

In the case of the automatic release, pieces of setting information (such as information on a connection to the document management system as a destination of registration, folder information of the destination of registration, setting of image conversion processing and so on) of the automatic release, are obtained from the worksheet. Note that when acquiring a FAX document image from FAX as the setting of the automatic processing and if the setting is such that the FAX document image is released in distribution to a folder mapping to a telephone number of a FAX document transmission source, it follows that there is obtained a piece of information on a folder in the document management system of the destination of registration, which folder is mapped to a preset telephone number of the transmission source. Then, in step S902, connection processing to the storage folder of the document management system is executed, and the processing advances to step S920, wherein the data to be released are prepared.

If the automatic release is not specified, in step S910, it is possible to set that a registration target document is at first selected from among the documents managed on the worksheet and how the documents stored in the document registration system after being registered in the document management system, should be treated (deleted and so on). The registration target document is selected in a way that displays, in a table format of the worksheet, the document IDs of the plurality of registration target documents managed on the worksheet and the indexes mapping to the respective documents, and prompts the user to select a registration processing target document from among those documents. Note that the document ID and the index selected on the worksheet are highlight-displayed when in the selection processing, which is easy to recognize that these elements are being selected.

In step S911, login processing to the document management system as the destination of registration is executed, and a folder for storing the document is specified.

In step S912, options for the document registration can be set, and it is possible to set that an execution log related to the document registration processing is taken and to set a conversion of the document format for the document registration.

In step S920, the document information etc to be registered in the document management system is cached in the data area 254 for outputting, thus making a preparation for the registration.

In step S930, it is judged whether there is given an indication of the format conversion of the document image to be registered or an indication of processing of adding a result of effecting an OCR analysis of the document image. In the case of judging that this indication is given, the image processing is executed based on this indication in step S931.

In step S940, the prepared document data etc undergo processing of being registered in the folder of the document management system as the destination of registration.

In step S950, it is judged whether there is indicated a deletion of the document stored in the document registration system after the document registration in the document management system. If the deletion thereof is indicated, the delete processing of the document concerned is implemented in step S951, and the release processing is finished.

(Job Creation Processing (FIGS. 12))

Figure 12:
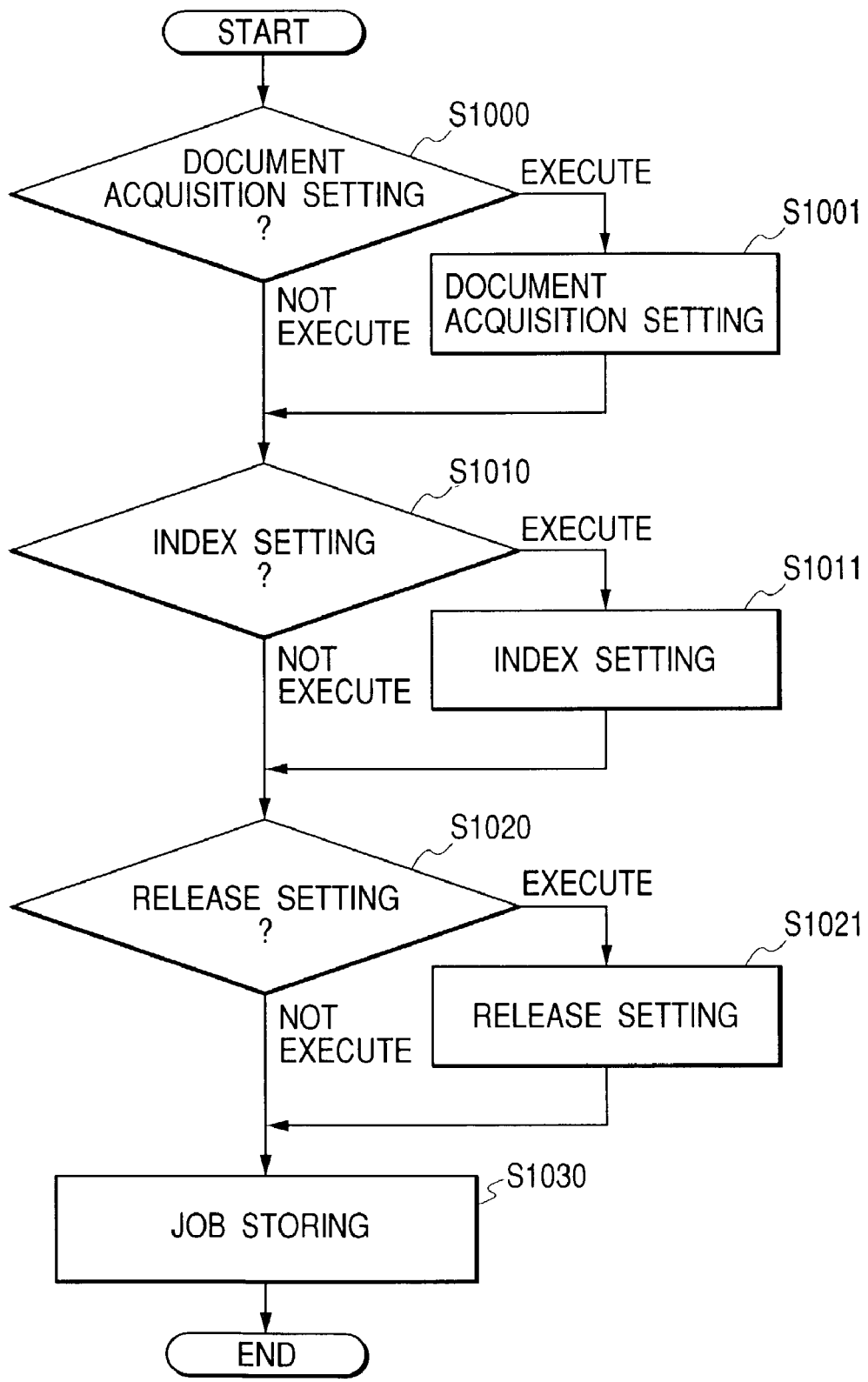
FIG. 12 is a flowchart showing job generation processing.

The processing (S160) of creating one job by establishing the respective settings of the document acquisition process, the index processing and the release processing, will be described in depth referring to FIG. 12.

In step S1000, it is judged whether job setting for the automatic document acquisition is specified. If specified, the processing proceeds to step S1001, wherein the setting for the document acquisition is done by setting the worksheet for use and specifying the scanner as a source device and the folder.

In step S1010, it is judged whether the setting of the automatic process for the index input is indicated or not. If indicated, in step S1011, there are set items required for automatically executing the index processing such as setting the worksheet for use, specifying the registration form or specifying the automatic search for the registration form and so forth.

In step S1020, it is judged whether the setting of the automatic release (document registration) is indicated. Is indicated, in step S1021, there are set necessary items of information for executing the automatic release processing, such as the processing target worksheet, a destination of document registration (the document management system, the folder) and the way of dealing with the document after being registered.

In step S1030, pieces of setting information set in steps S1001, S1011 and S1021 are stored in a way that attaches pieces of identifying information (names of jobs) thereto.

Note that a plurality of jobs with a combination of the variety of settings can be registered and stored.

(Job Execution Processing (FIG. 13))

Figure 13:
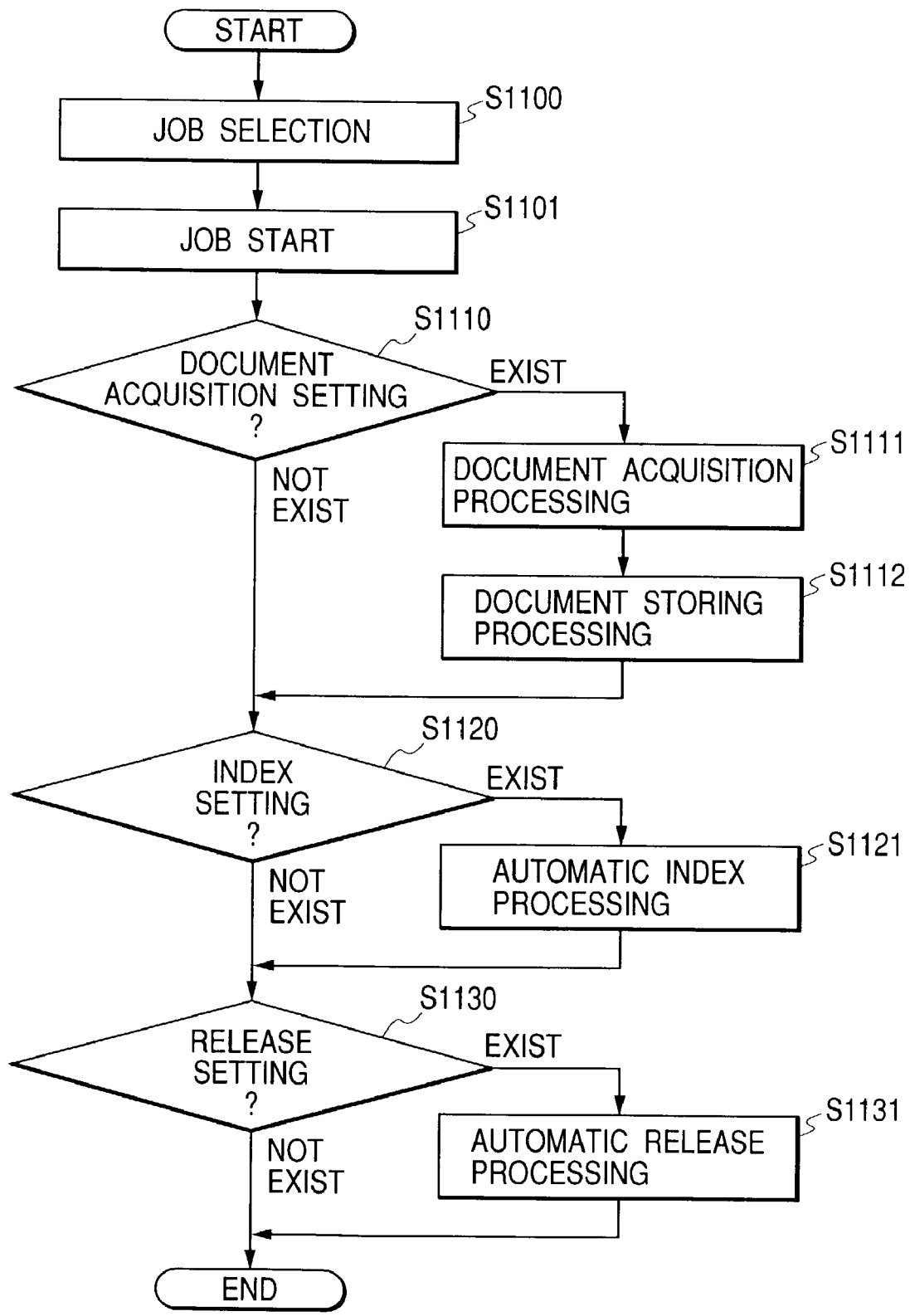
FIG. 13 is a flowchart showing job execution processing.

The job execution processing (S130, S131) will be explained in detail referring to FIG. 13.

In step S1100, a desired job is selected by the user from among a plurality of registered/stored jobs.

In step S1101, conditions set to the selected job are read, and the job execution processing is started.

In step S1110, it is judged whether a job of an automatic document acquisition is set. If this job is judged to be set, the document acquisition processing of acquiring the document from the device on the basis of the setting is executed in step S1111, and the acquired document is managed and stored on the worksheet in step S1112.

In step S1120, it is judged whether the automatic processing for the index input is set. If judged to be set, the automatic index processing is executed based on the set condition in step S1121. If the automatic form detection is conducted in this automatic index processing, the image processing such as the variable correction, the positional deviation correction etc is effected, and further the information on the document image is obtained based on the setting in the area (field). Moreover, the image information undergoes the smoothing processing, and thereafter the character recognition (OCR) processing is executed, whereby the index data based on the text data can be automatically created.

In step S1130, it is judged whether the automatic release (document registration) processing is set. If this processing is judged to be set, the automatic release processing to the document management system is executed based on the set condition in step S1131.

The document acquisition processing through document registration processing are set in the job, thereby enabling a series of processing to be batch-processed.

Figure 14:
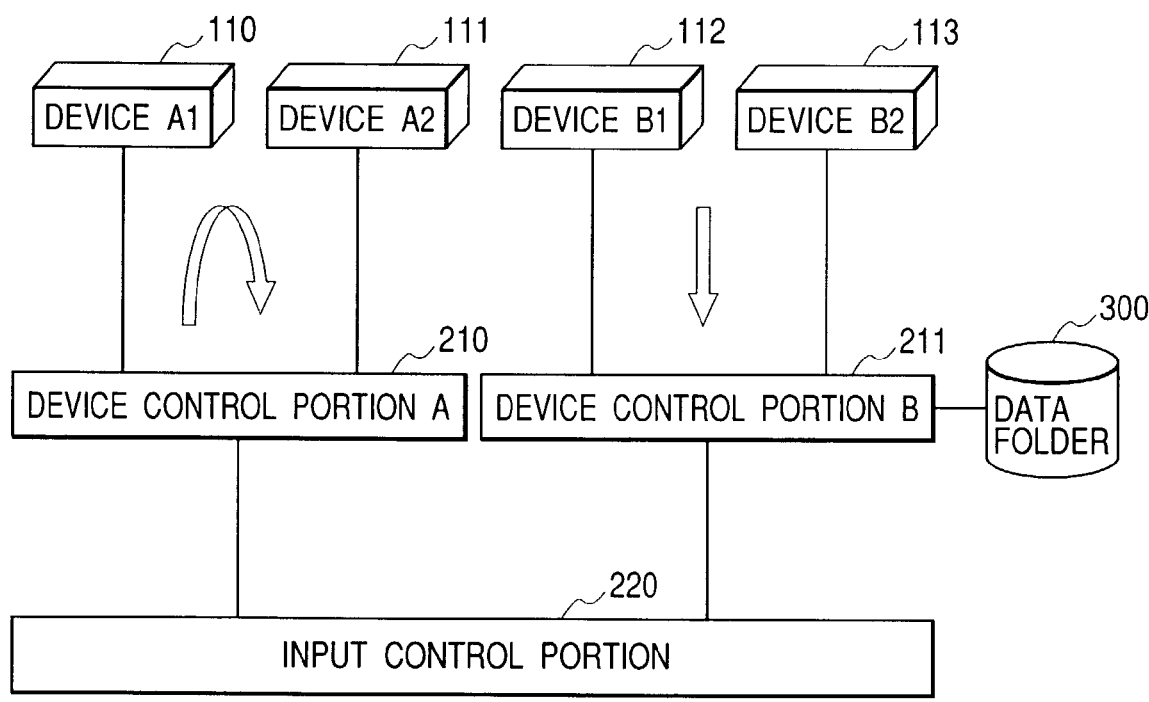
FIG. 14 is a diagram showing an extended device control portion.

(Extended Device Control Portion (FIG. 14))

According to this embodiment, as the system for obtaining the document from the device, the device control in FIG. 2 can be further extended corresponding to a plurality of modes. This extended device control will be explained referring to FIG. 14.

A device control portion A(210) accesses the device from the document registration system, thereby acquiring the document. The document data can be acquired from a plurality of devices (110, 111) adapted to an equal access acquisition method by use of this control portion A.

A device control portion B(211) is accessed not from the document registration system but from the device, thereby acquiring the document transmitted. In this case also, the document can be acquired from the a plurality of devices (112, 113) adapted to an equal accessing method.

Further, the device control portion B is provided with its own data folder 300 in order to correspond to document transfer processing simultaneously from the plurality of devices. Further, there is made a scheme enabling this data folder 300 to be structured as a hierarchical folder, wherein the document transfer processing with a folder path specified from the device is also set possible. Note that the use of the general-purposed file transfer protocol (FTP) as an access protocol in this case, facilitates a corresponding operation of the device and also enables the document to be transferred from a general computer.

Further, there is provided a means capable of acquiring, on the occasion of acquiring the document data, pieces of attached (attribute) information (e.g., owner information of each document, source information in the case of a received-by-fax document, information on the connection device and so on) related to the document data concerned other than the document image, and utilizing the data thereof within the system.

An input control portion 220 is capable of handling sets of the document data in unification so as not to be confused, which have been acquired by the respective device control portions.

(Extended Document Management System Control Portion (FIG. 15))

Figure 15:
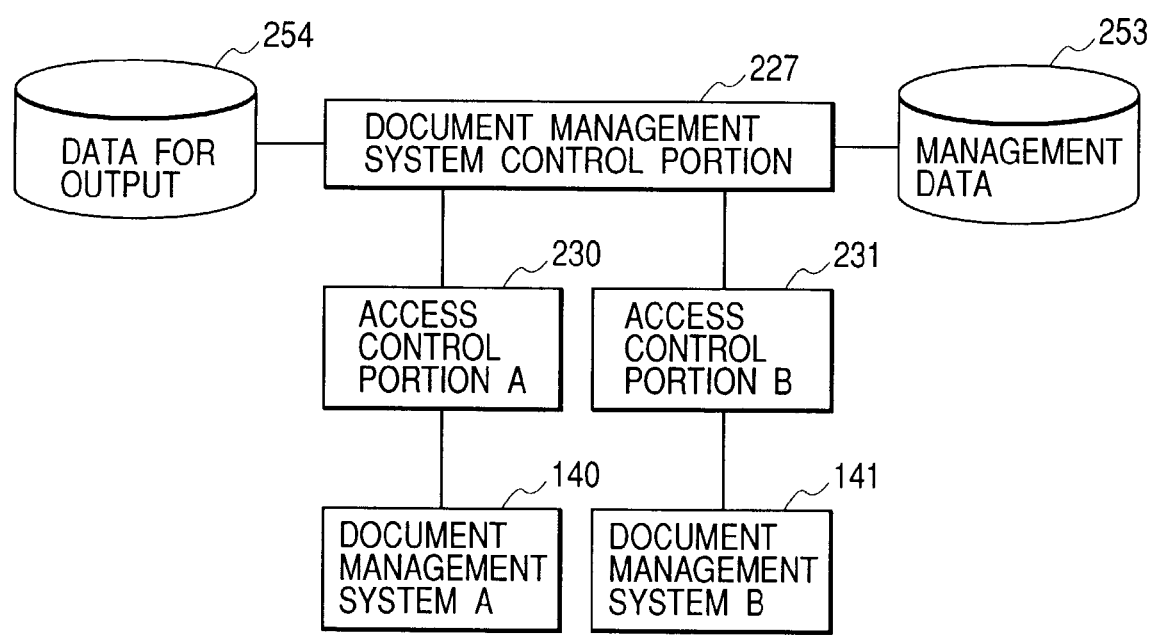
FIG. 15 is a diagram showing an extended document management system control portion.

According to this embodiment, a plurality of document management systems for managing the documents in a variety of different formats can be so extended as to be capable of registering the document data acquired from the devices and the indexes (attached information) thereof. FIG. 15 is an explanatory diagram showing a way of corresponding to a case where a document management system A and a document management system B which manage the documents in different formats, coexist on the network.

Herein, it is general that an access means and a file format of a processable document are different depending on the type of the document management system, and therefore the document management system A(140) is provided with the access control portion A(230), while the document management system B(141) is provided with the access control portion B(231). Then, the document registration system 120 can correspond to a case where the plurality of document management systems for managing the documents in the different formats coexist, by changing the access control portion to be used corresponding to the document management system of a destination of registration.

Note that the information required for accessing each document management system is retained as management data 252 and fetched and used as the necessity arises.

Figure 11:
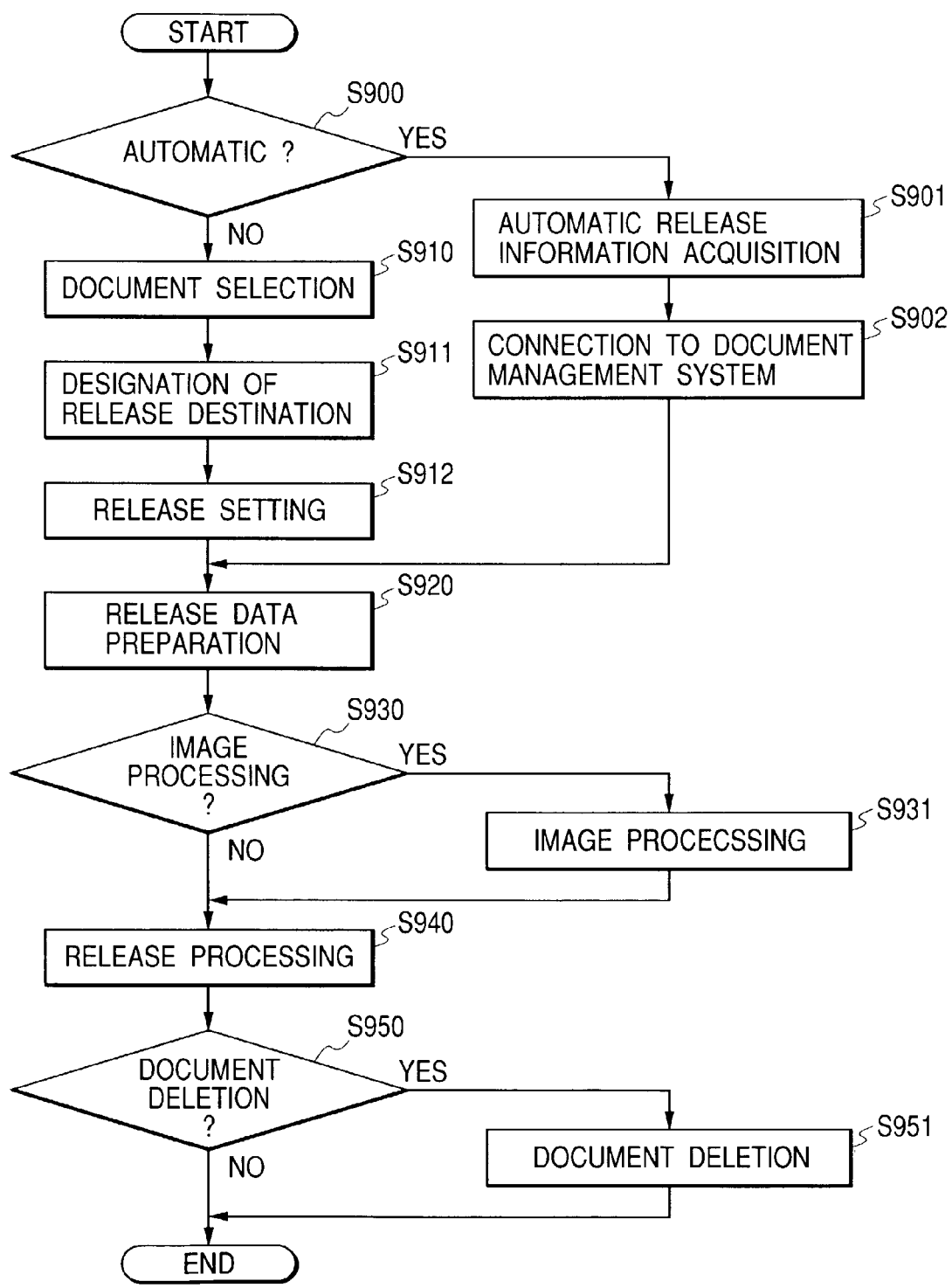
FIG. 11 is a flowchart showing release (data registration) processing.

(Supplement (FIG. 16) to Release Processing in FIG. 11)

Figure 16:
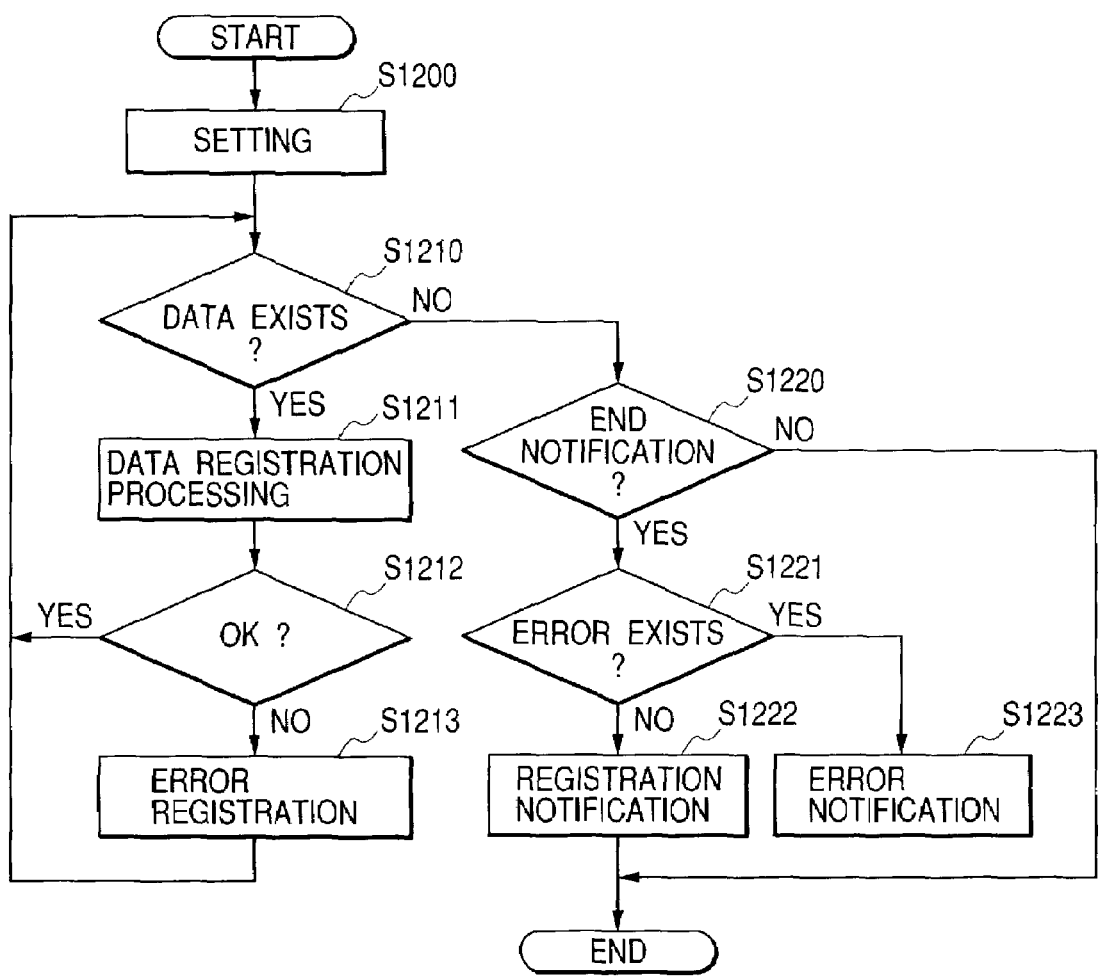
FIG. 16 is a flowchart showing a supplement to the release processing.

A supplement to the release (registration) processing (step S940) to the document management system will be described referring to FIG. 16.

In step S1200, setting processing is executed when starting the release processing, wherein a check of whether an end notification is required, and information acquisition processing of a destination of the end notification are carried out.

In step S1210, there is executed check processing of whether remaining data that should be registered in the document management system exist or not. If all the data that should be registered are not transmitted, the processing proceeds to step S1211, and, if there is no remaining data, the processing diverts to step S1220.

Registration processing of transmitting and registering the should-be-registered data to and in the document management system, is executed in step S1211.

In step S1212, it is judged whether the transmitted data are registered. When confirming that the data are registered, the processing returns to step S1210. If the registration falls into a failure, the processing proceeds to step S1213.

Step S1213 is processing executed when an error occurs in the data registration in the document management system, wherein data about the document with a registration error occurred are registered as registration error document data on a predetermined worksheet, and thereafter re-registration processing can be executed manually.

In step S1220, it is judged based on the setting in S1200 whether the user needs to be notified of an end of registration. If not required, the processing is finished.

Whereas if judged to be necessary for notifying the user of the end, in step S1221, it is judged whether an error is seen in the result of the data registration processing. If the error does not occur, in step S1222, there is executed mail notification processing of notifying that a new document is registered in a mail address in the registration notification registered beforehand. Whereas if judging that the error occurs, in step S1223, there is executed mail notification processing of giving a notification of error information to a mail address of the error notification registered beforehand.

(Automatic Document Registration Processing (FIG. 17) for Document Transmitted from Device)

Figure 17:
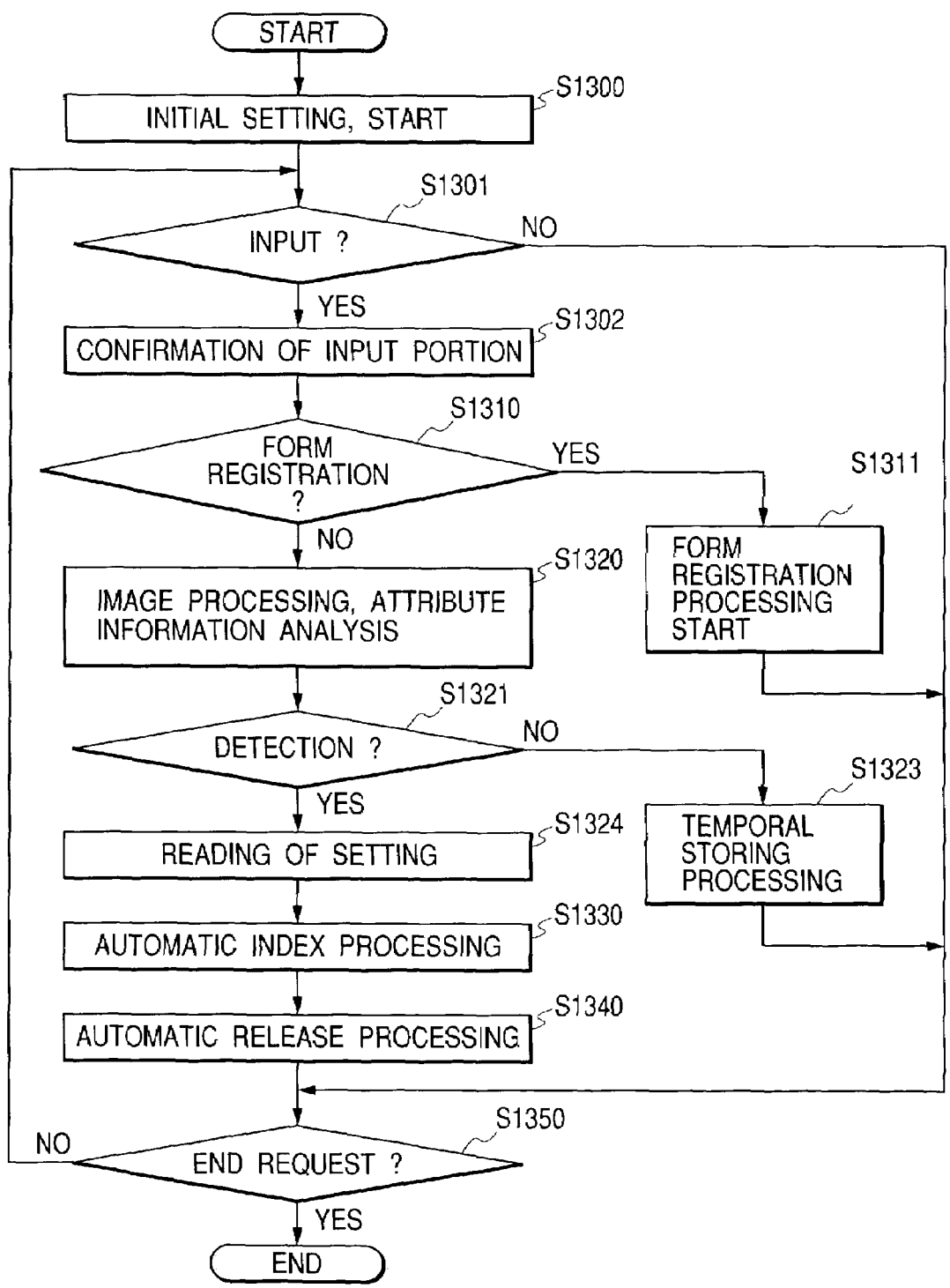
FIG. 17 is a flowchart showing automatic document registration processing of a document transmitted from a device.

FIG. 17 illustrates a flow in which the document data sent from the device automatically undergoes processing up to the document registration. Note that FIG. 17 shows the document registration automatic processing in the document management system and the form registration automatic processing in the document registration system.

In step S1300, various items needed for executing the automatic document processing are set previously, and this set automatic document processing is started up.

The setting items set herein include setting related to the document input processing, setting of the folder operated for the form registration processing and of the attribute information for use, setting of the worksheet for executing the processing corresponding to each of the attributes, and setting of the form used for implementing the automatic index input.

Incidentally, the following are examples of the attribute information. The attribute information is used for distinguishing between categories of the automatic processing and for the index input.

Type of device;
Folder path (the file server 130, the data folder 300 for the device control portion);
Owner information of the document;
Source information in the received-by-fax document; and
Result of area analysis.

In step S1301, it is detected whether the document input is done. If the document input is done, the processing proceeds to step S1302. According to this embodiment, the document data inputted from the device via the device control portion and the document data inputted from the device via the folder control portion, can be handled in unification. The assumption in this embodiment is that the document transmitted by the push technique from the device be inputted via the data folder of the device control portion. Note that a detection as to whether a new document is inputted to the folder, is made by periodically checking the folder as in steps S721 through S725 in FIG. 9.

In step S1302, it is checked which route the inputted document takes to come in.

In step S1310, it is judged whether the document is a document inputted via the folder for the form registration. If judged to be inputted via the folder for the form registration, in step S1311, a processing portion for the form registration is automatically started up, and the inputted document is registered as a form.

In step S1320, various categories of attribute information are analyzed, and it is checked whether processing corresponding to the acquired attribute information is defined or not. For example, it is assumed that the processing be defined so that the document inputted via a predetermined data folder A and the document inputted directly from a predetermined device undergo the automatic processing of registering in a folder X of a predetermined document management system. Further, in the case of acquiring the FAX document image, it is assumed that there be defined the setting of distributing and registering this document image to the folders of the plurality of document management systems on the basis of the telephone number of the transmission source of the FAX document image.

Note that the attribute information includes pieces of information about the device and the folder that are obtained by the input control portion 220, and information obtained from a predetermined target area by invoking the processing corresponding to the automatic index processing at this stage and analyzing the form.

In step S1321, it is judged whether the automatic processing corresponding to the attribute information of the inputted document is detected. If not detected, the processing proceeds to step S1323, wherein the inputted document is cached, and thereafter the user is able to manually process it.

Whereas if the automatic processing corresponding thereto is detected, the processing proceeds to step S1324, wherein necessary pieces of information for the automatic index processing and the automatic release processing are read out. Then, in step S1330, the automatic index input is effected by use of the area information etc corresponding to the form according to the necessity. The automatic release processing of registering the document concerned and the index in the document management system, is executed in step S1340. In the case of, for instance, the FAX document image, though hereinafter explained in detail, when detecting such processing as to register it in a folder, mapping to a telephone number of a transmission source of the FAX document image, of the document management system, the folder of the document management system of a destination of registration is determined based on a preset telephone number-to-registration destination mapping table, then information of the destination of registration is read therefrom, and an index thereof is inputted, thus registering the document image and the index together in the determined folder of the document management system.

In step S1350, it is judged whether an end request of the automatic document processing is made. If requested, the processing is terminated. Whereas if not requested, the processing loops back to step S1301, wherein the processing continues.

(Distribution Setting Registration (FIG. 18))

Processing for a setting registration of a mapping between the telephone number of the FAX transmission source and the folder of the document management system serving as a destination of registration, will be explained referring to FIG. 18. On the occasion of the automatic processing in FIG. 17, if it is set that "the folder of the document management system as the destination of registration is determined based on the telephone number of the transmission telephone number of the FAX document image", the destination of registration is automatically determined based on this mapping. Thus, the FAX document can be automatically distributed based on the FAX transmission source, and hence the management for every FAX transmission source is facilitated.

A mail address for notifying of whether the storage of the FAX document image succeeds or falls into a failure, is set in step S1401.

In step S1402, the telephone number of the FAX transmission source that is used for the automatic distribution, is inputted.

In step S1403, the folder, of the document management system as the destination of registration, into which the FAX document image is registered mapping to the telephone number of the FAX transmission source, is specified.

In step S1404, it is judged whether an indication of saving the distribution setting is given from the user. If not given, the processing loops back to S1401 through S1403, wherein the settings of the mail address, the telephone number and the release destination folder can be modified. Whereas if judging that the saving indication is given, the processing proceeds to step S1405.

In step S1405, it is judged whether the folder specified in step S1403 exits in the document management system serving as the release destination. If this folder does not exist, the processing goes to step S1406, in which the folder specified is created.

In step s1407, the telephone number of the FAX transmission source, the folder of the document registration system as the release destination and the mail address for notification are stored as the distribution setting of the FAX document image in a way that maps these pieces of information to each other. In step S1408, if indicated to terminate the distribution setting processing, the processing comes to an end. If setting is further conducted, the processing loops back to S1401, wherein the distribution setting processing continues.

Figure 19:
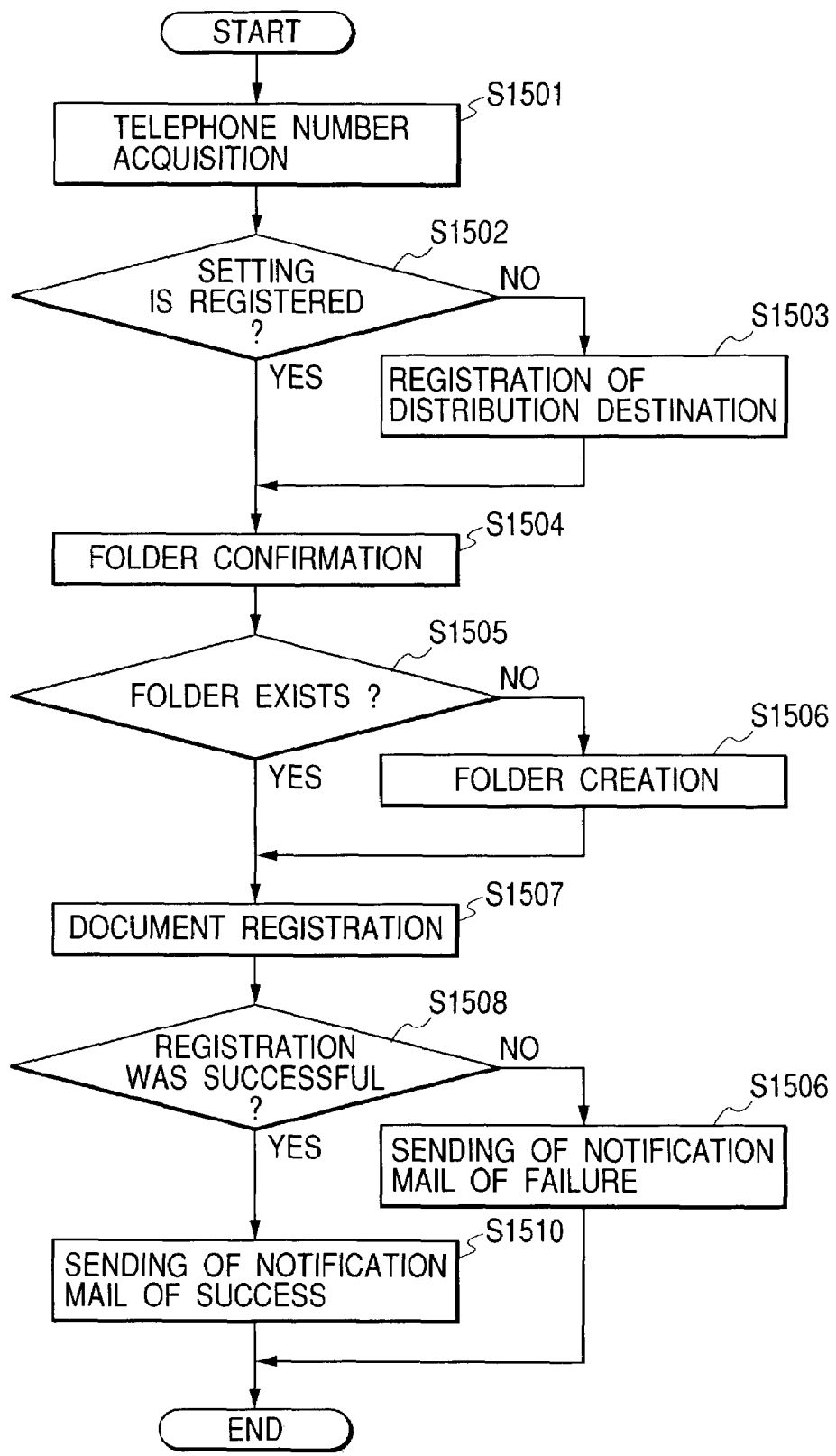
FIG. 19 is a flowchart showing automatic release processing of a FAX document image.

(Automatic Release Processing of FAX Document Image (FIG. 19))

Figure 18:
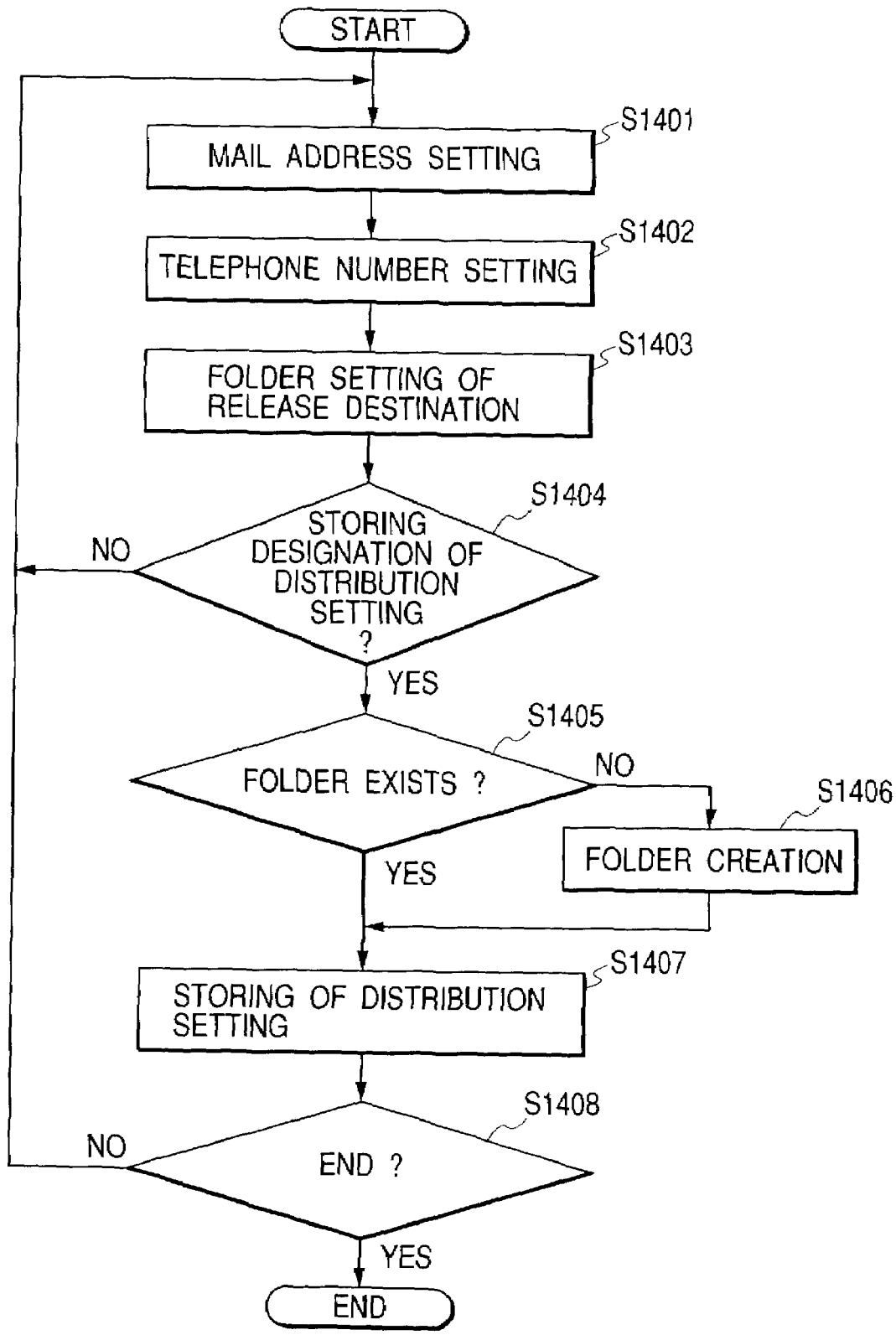
FIG. 18 is a flowchart showing distribution setting registration processing.

Explained herein are details of the automatic release processing (S1340) in the case of executing the automatic document registration processing in FIG. 17 that involves the use of the automatic distribution setting of the FAX document image explained in FIG. 18.

In step S1501, the telephone number of the transmission source of the FAX document image, which is contained in the attribute information, is acquired. It is judged in step S1502 whether this telephone number is registered in the telephone number-to-release destination folder mapping table for the distribution setting set in FIG. 18. When judging that the setting about this telephone number of not set, the processing proceeds to step S1503. In step S1503, a name of the folder of the document management system as a destination of storage is automatically set, and this telephone number and the folder name are registered mapping to each other in the telephone number-to-release destination folder mapping table for the distribution setting set in FIG. 18. With this contrivance, it follows that a FAX document image transmitted next time from the transmission source is released to (registered in) this automatically set folder. Note that the telephone number is used as the name of the automatically set folder, however, folder names other this may also be used. For example, a company name is searched for based on the telephone number of the transmission source of the FAX document by utilizing a telephone number search system etc provided by other server, and this company name may be used as a folder name. Further, a location is judged from an out-of-town telephone exchange number, then a name of this location is set as a parent folder name, and the folder name, which is the searched company name, may be created on a folder hierarchy thereunder.

In step S1504, the processing is to query the document management system whether there exists a folder as the distribution destination. If judging in step S1505 that such a folder does not exist, the processing proceeds to step S1506, wherein the document management system is indicated to create a folder given the folder name set as the destination of registration.

In step s1507, the FAX document image is automatically released for its registration in the relevant folder on the basis of the automatic distribution setting.

In step S1508, it is judged whether the FAX document image concerned has been registered in the folder. If registered, the processing proceeds to step S1510, in which an E-mail for a registration success notification indicating which folder receives the registration of the FAX document image and which document management system this folder belongs to, is delivered to a mail address set in FIG. 18.

Whereas if judging in step S1508 that the registration falls into a failure, the processing proceeds to step S1509, wherein the E-mail for the registration failure notification indicating that the registration of the FAX document image falls into the failure, is delivered to the mail address set in FIG. 18.

As discussed above, according to this embodiment, the folder of the document management system serving as the destination of registration of the FAX image can be dynamically changed corresponding to the telephone number of the FAX transmission source.

Further, the document image can be automatically distributed based on the FAX transmission source, and therefore the management for every FAX transmission source is facilitated.

Moreover, even when the FAX transmission source and the folder as the destination of registration are not preset, the folder of the document management system can be automatically set, and the document can be cached in this folder.

What is claimed is:

1. A document registration system connected via a network to a plurality of external devices having a FAX receiving function and to a document management system, said document registration system comprising:

setting means for setting mapping information showing a mapping between telephone numbers of transmission sources of a FAX document image and registration destination folders of the document management system, wherein the mapping information is stored in said document registration system;

acquisition means for acquiring a FAX document image from any one of the plurality of external devices having the FAX receiving function, wherein the FAX document image is transmitted from the transmission source of the FAX document image to the external device and is acquired from the external device by said document registration system;

telephone number acquisition means for acquiring a telephone number of the transmission source of the FAX document image acquired by said acquisition means;

determining means for automatically determining a folder of the document management system as a destination of registration on the basis of the mapping information and the acquired telephone number of the transmission source; and registration means for attaching an index to the FAX document image and registering the FAX document image attached with the index to the folder of the document management system determined by said determining means as the destination of registration.

2. A document registration system according to claim 1, wherein said determining means, if the transmission source telephone number acquired by said telephone number acquisition means is not set in the mapping information, automatically creates and sets a new folder of the document management system as the destination of registration, this folder being mapped to the transmission source telephone number in the mapping information.

3. A document registration system according to claim 1, further comprising folder creation instruction means for instructing, when checking whether the folder determined by said determining means exists in the document management system as the destination of registration and judging that this folder does not exist, the document management system to create the determined folder.

4. A document registration system according to claim 1, wherein said setting means sets the mapping information that maps the telephone number of the transmission source, the folder as the destination of registration and a mail address used for a notification to each other, and said registration means, when registering the FAX document image in the folder of the document management system as the destination of registration, transmits the notification mail showing that the FAX document image has been registered to the mail address mapping thereto.

5. A document registration system according to claim 1, wherein said registration means identifies a form coincident with the FAX document image, then executes character recognition processing of an area image corresponding to an area set in the identified form, and registers the FAX document image in the folder of the document management system in a way that attaches a result of the character recognition processing as the index to the FAX document image.

6. A document registration system according to claim 1, wherein the document management system is one of a plurality of document management systems connected via the network to said document registration system.

7. A method performed by a document registration system, which is connected via a network to a plurality of external devices having a FAX receiving function and to a document management system, said method comprising:

a setting step for setting mapping information showing a mapping between telephone numbers of transmission sources of a FAX document image and registration destination folders of the document management system, wherein the mapping information is stored in said document registration system;

an acquisition step of acquiring a FAX document image from any one of the plurality of external devices having the FAX receiving function, wherein the FAX document image is transmitted from the transmission source of the FAX document image to the external device and is acquired from the external device by said document registration system;

a telephone number acquisition step of acquiring a telephone number of the transmission source of the FAX document image acquired in said acquisition step;

a determining step of automatically determining a folder of the document management system as a destination of registration on the basis of the mapping information and the acquired telephone number of the transmission source; and a registration step of attaching an index to the FAX document image and registering the FAX document image attached with the index to the folder of the document management system determined in said determining step as the destination of registration.

8. A document registration method according to claim 7, wherein said determining step involves, if the transmission source telephone number acquired in said telephone number acquisition step is not set in the mapping information, automatically creating and setting a new folder of the document management system as the destination of registration, this folder being mapped to the transmission source telephone number in the mapping information.

9. A document registration method according to claim 7, further comprising a folder creation instruction step of instructing, when checking whether the folder determined in said determining step exists in the document management system as the destination of registration and judging that this folder does not exist, the document management system to create the determined folder.

10. A document registration method according to claim 7 wherein said setting step involves setting the mapping information that maps the telephone number of the transmission source, the folder as the destination of registration and a mail address used for a notification to each other, and said registration step involves, when registering the FAX document image in the folder of the document management system as the destination of registration, transmits the notification mail showing that the FAX document image has been registered to the mail address mapping thereto.

11. A document registration method according to claim 7, wherein said registration step involves identifying a form coincident with the FAX document image, then executing character recognition processing of an area image corresponding to an area set in the identified form, and registering the FAX document image in the folder of the document management system in a way that attaches a result of the character recognition processing as the index to the FAX document image.

12. A document registration method according to claim 7, wherein the document management system is one of a plurality of document management systems connected via the network to said document registration system.

13. A document registration program stored on a computer-readable medium, the program comprising program codes, executable by a computer, for making a document registration system, which is connected via a network to a plurality of external devices having a FAX receiving function and to a document management system, execute:

a setting step for setting mapping information showing a mapping between telephone numbers of transmission sources of a FAX document image and registration destination folders of the document management system, wherein the mapping information is stored in said document registration system;

an acquisition step of acquiring a FAX document image from any one of the plurality of external devices having the FAX receiving function, wherein the FAX document image is transmitted from the transmission source of the FAX document image to the external device and is acquired from the external device by said document registration system;

a telephone number acquisition step of acquiring a telephone number of the transmission source of the FAX document image acquired in said acquisition step;

a determining step of automatically determining a folder of the document management system as a destination of registration on the basis of the mapping information and the acquired telephone number of the transmission source; and a registration step of attaching an index to the FAX document image and registering the FAX document image attached with the index to the folder of the document management system determined in said determining step as the destination of registration.

14. A computer-readable storage medium stored with a document registration program comprising program codes, executable by a computer, for making a document registration system, which is connected via a network to a plurality of external devices having a FAX receiving function and to a document management system, execute:

setting step for setting mapping information showing a mapping between telephone numbers of the transmission sources of a FAX document image and registration destination folders of the document management system, wherein the mapping information is stored in said document registration system;

an acquisition step of acquiring a FAX document image from any one of the plurality of external devices having the FAX receiving function, wherein the FAX document image is transmitted from the transmission source of the FAX document image to the external device and is acquired from the external device by said document registration system;

a telephone number acquisition step of acquiring a telephone number of the transmission source of the FAX document image acquired in said acquisition step;

a determining step of automatically determining a folder of the document management system as a destination of registration on the basis of the mapping information and the acquired telephone number of the transmission source; and a registration step of attaching an index to the FAX document image and registering the FAX document image attached with the index to the folder of the document management system determined in said determining step as the destination of registration.

* * * * *